(12) United States Patent
Hustad et al.

(10) Patent No.: US 8,362,162 B2
(45) Date of Patent: Jan. 29, 2013

(54) PROCESSES OF CONTROLLING MOLECULAR WEIGHT DISTRIBUTION IN ETHYLENE/ALPHA-OLEFIN COMPOSITIONS

(75) Inventors: Phillip D. Hustad, Manvel, TX (US); Roger L. Kuhlman, Lake Jackson, TX (US); Robert D. J. Froese, Midland, MI (US); Timothy T. Wenzel, Midland, MI (US); Joseph N. Coalter, III, Katy, TX (US)

(73) Assignee: Dow Global Technologies LLC, Midland, MI (US)

( * ) Notice: Subject to any disclaimer, the term of this patent is extended or adjusted under 35 U.S.C. 154(b) by 1160 days.

(21) Appl. No.: 11/608,171

(22) Filed: Dec. 7, 2006

(65) Prior Publication Data
US 2007/0135575 A1    Jun. 14, 2007

Related U.S. Application Data

(60) Provisional application No. 60/749,308, filed on Dec. 9, 2005.

(51) Int. Cl.
  *C08F 210/16* (2006.01)
  *C08F 4/659* (2006.01)
  *C08F 4/651* (2006.01)
(52) U.S. Cl. ........ 526/172; 526/113; 526/114; 526/160; 526/170; 526/348; 526/348.2; 526/348.6; 526/161
(58) Field of Classification Search .................. 526/113, 526/114, 160, 161, 170, 172, 348, 348.2, 526/348.6
See application file for complete search history.

(56) References Cited

U.S. PATENT DOCUMENTS

| | | |
|---|---|---|
| 2,973,344 A | 2/1961 | Fasce |
| 2,997,432 A | 8/1961 | Kobe et al. |
| 3,873,642 A | 3/1975 | Jezl |
| 4,146,492 A | 3/1979 | Cusano et al. |
| 4,299,931 A | 11/1981 | Coran et al. |
| 4,429,079 A | 1/1984 | Shibata et al. |
| 4,510,031 A | 4/1985 | Matsumura et al. |
| 4,780,228 A | 10/1988 | Gardiner et al. |
| 4,798,081 A | 1/1989 | Hazlitt et al. |
| 5,068,047 A | 11/1991 | Chung et al. |
| 5,266,626 A | 11/1993 | Hert et al. |
| 5,322,728 A | 6/1994 | Davey et al. |
| 5,391,629 A | 2/1995 | Turner et al. |
| 5,468,810 A | 11/1995 | Hayakawa et al. |
| 5,594,080 A | 1/1997 | Waymouth et al. |
| 5,597,881 A | 1/1997 | Winter et al. |
| 5,610,253 A | 3/1997 | Hatke et al. |
| 5,624,991 A | 4/1997 | Harada et al. |
| 5,733,980 A | 3/1998 | Cozewith et al. |
| 5,783,531 A | 7/1998 | Andrew et al. |
| 5,798,420 A | 8/1998 | Cozewith et al. |
| 5,868,984 A | 2/1999 | Winter et al. |
| 5,892,076 A | 4/1999 | Nickias |
| 5,916,953 A | 6/1999 | Jacoby et al. |
| 5,969,070 A | 10/1999 | Waymouth et al. |
| 5,994,255 A | 11/1999 | Nickias et al. |
| 6,008,262 A | 12/1999 | McKay et al. |
| 6,025,448 A | 2/2000 | Swindoll et al. |
| 6,096,668 A | 8/2000 | Abuto et al. |
| 6,114,457 A | 9/2000 | Markel et al. |
| 6,121,402 A | 9/2000 | Machida et al. |
| 6,136,937 A | 10/2000 | Lai et al. |
| 6,147,180 A | 11/2000 | Markel et al. |
| 6,160,029 A | 12/2000 | Chaudhary et al. |
| 6,187,424 B1 | 2/2001 | Kjellqvist et al. |

(Continued)

FOREIGN PATENT DOCUMENTS

| | | |
|---|---|---|
| EP | 0 274 906 A2 | 7/1988 |
| EP | 0 719 797 A2 | 7/1996 |

(Continued)

OTHER PUBLICATIONS

Database Caplus [Online], Chemical Abstracts Service, Columbus, OH, US; Matsuura, Sadahiko, et al: Manufacture of polyolefins with high molecular weight and narrow molecular weight distribution using post-metallocene catalysts (XP002432182) retrieved from STN Database accession No. 2002:958650 abstract and JP 2002 363210A, Mitsui Chemicals Inc., Dec. 18, 2002.

(Continued)

*Primary Examiner* — Roberto Rabago
(74) *Attorney, Agent, or Firm* — Whyte Hirschboeck Dudek SC

(57) ABSTRACT

The present invention relates to compositions and processes of making polymers having a controlled molecular weight distribution. The molecular weight distribution is controlled, for example, by controlling the relative monomer concentrations during contact with a pre-catalyst and/or using a catalyst comprising a catalytic amount of a molecule having the structure:

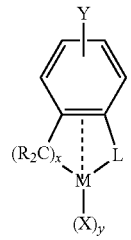

wherein
M=group 2-8 metal, preferably group 4 as a neutral or charged moiety;
Y=any substituent including fused rings;
L=any ligating group, especially a pyridyl or pyridylamide;
X=alkyl, aryl, substituted alkyl, H or hydride, halide, or other anionic moiety;
y=an integer from 0 to the complete valence of M;
R=alkyl, aryl, haloalkyl, haloaryl, hydrogen, etc;
x=1-6, especially 2;
Dashed line=optional bond, especially a weak bond; and
X and $(CR_2)_x$ may be tethered or part of a ring.

13 Claims, 22 Drawing Sheets

U.S. PATENT DOCUMENTS

| | | |
|---|---|---|
| 6,197,404 B1 | 3/2001 | Varona |
| 6,262,174 B1 | 7/2001 | Cooper et al. |
| 6,262,203 B1 | 7/2001 | Chien et al. |
| 6,362,252 B1 | 3/2002 | Prutkin |
| 6,420,507 B1 | 7/2002 | Kale et al. |
| 6,455,638 B2 | 9/2002 | Laughner et al. |
| 6,462,149 B1 | 10/2002 | Tilston et al. |
| 6,537,472 B2 | 3/2003 | Masubichi |
| 6,566,446 B1 | 5/2003 | Parikh et al. |
| 6,566,544 B1 | 5/2003 | Waymouth et al. |
| 6,656,601 B1 | 12/2003 | Kawachi et al. |
| 6,815,023 B1 | 11/2004 | Tatarka et al. |
| 7,005,395 B2 | 2/2006 | Zafiroglu et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2002/0123580 A1 | 9/2002 | Wenzel et al. |
| 2002/0192437 A1 | 12/2002 | Takagi et al. |
| 2003/0027954 A1 | 2/2003 | Becke et al. |
| 2003/0195128 A1 | 10/2003 | Deckman et al. |
| 2003/0216518 A1 | 11/2003 | Tau et al. |
| 2004/0082750 A1 | 4/2004 | Tau et al. |
| 2004/0092662 A1 | 5/2004 | Goto et al. |
| 2004/0121922 A1 | 6/2004 | Okada et al. |
| 2004/0158011 A1 | 8/2004 | Jain et al. |
| 2004/0192147 A1 | 9/2004 | Smith et al. |
| 2004/0220050 A1 | 11/2004 | Frazier et al. |
| 2005/0009993 A1 | 1/2005 | Morioka et al. |
| 2005/0085600 A1 | 4/2005 | Ehrman et al. |
| 2006/0030667 A1 | 2/2006 | Yalvac et al. |
| 2006/0198983 A1 | 9/2006 | Patel et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2008/0299857 A1 | 12/2008 | Harding et al. |

FOREIGN PATENT DOCUMENTS

| | | |
|---|---|---|
| EP | 0 877 050 | 11/1998 |
| EP | 1 026 184 | 8/2000 |
| EP | 0 958 313 B1 | 9/2002 |
| EP | 1 241 175 A2 | 9/2002 |
| EP | 1241175 A2 | 9/2002 |
| EP | 1 262 498 A2 | 12/2002 |
| JP | 2002-206007 A | 7/2002 |
| JP | 20020363210 A | 12/2002 |
| JP | 2004-204058 | 7/2004 |
| JP | 2004-204058 A | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 00/78859 | 12/2000 |
| WO | WO 01/62847 A1 | 8/2001 |
| WO | 0246249 A2 | 6/2002 |
| WO | WO 02/46249 A2 | 6/2002 |
| WO | WO 02/066540 A2 | 8/2002 |
| WO | WO 02/079322 | 10/2002 |
| WO | WO 03/014046 A1 | 2/2003 |
| WO | 03040202 A2 | 5/2003 |
| WO | WO 03/040202 A2 | 5/2003 |
| WO | 2004016627 A1 | 2/2004 |
| WO | WO 2004/016627 A1 | 2/2004 |
| WO | 2004026925 A1 | 4/2004 |
| WO | WO 2004/026925 A2 | 4/2004 |
| WO | 2004041928 A1 | 5/2004 |
| WO | WO 2004/041928 A1 | 5/2004 |
| WO | 2005090472 A2 | 9/2005 |
| WO | WO 2005/090426 A1 | 9/2005 |
| WO | WO 2005/090427 * | 9/2005 |
| WO | WO 2005/090427 A2 | 9/2005 |
| WO | 2006007094 A2 | 1/2006 |
| WO | 2006009976 A1 | 1/2006 |
| WO | WO 2006/007094 A2 | 1/2006 |
| WO | WO 2006/009976 A1 | 1/2006 |
| WO | 2006101597 A1 | 9/2006 |
| WO | WO 2006/101597 A1 | 9/2006 |
| WO | WO 2006/102152 | 9/2006 |
| WO | 2007035485 A1 | 3/2007 |
| WO | WO 2007/035485 A1 | 3/2007 |
| WO | 2007037944 A2 | 4/2007 |
| WO | WO 2007/037944 A2 | 4/2007 |
| WO | WO 2007/067965 | 6/2007 |

OTHER PUBLICATIONS

Arriola, Daniel J. et al., Catalytic Production of Olefin Block Copolymers via Chain Shuttling Polymerization, Science (Washington, DC, United States), May 12, 2006, pp. 714-719, vol. 312, XP008068979.

International Search Report and Written Opinion of the International Searching Authority, mailed Aug. 1, 2007 (PCT/US2006/061761).

Spencer, Liam P. et al., Synthesis and reactivity of zirconium and hafnium complexes incorporating chelating diamido-N-heterocyclic-carbene ligands, Journal of Organometallic Chemistry, 690(24-25), 5788-5803 Coden: JORCAI; ISSN: 0022-328X, 2005, XP005391781.

Kui, Steven C. F. et al., Observation of Intramolecular C-H . . . F-C Contacts in Non-Metallocene Polyolefin Catalysts: Model for Weak Attractive Interactions between Polymer Chain and Noninnocent Ligand, Angewandte Chem., International Edition, 42(14), 1628-1632 Coden: ACIEF5, ISSN: 1433-7851, 2003, XP008078468.

Shao, Pengcheng, et al., Dibenzylzirconium Complexes of Chelating Aminodiolates. Synthesis, Structural Studies, Thermal Stability, and Insertion Chemistry, Oranometallics, 19(4), 509-520 Coden: ORGND7, ISSN: 0276-7333, 2000, XP001125766.

Spencer et al., "Synthesis and reactivity of zirconium and hafnium complexes incorporating chelated . . . " J. Organometallic Chemistry (2005), pp. 5788-5803, vol. 690.

Kui et al., "Observation of intramolecular . . . ", Angewandte Chemie Intl. Ed. (2003), pp. 1628-1632, vol. 42.

Shao et al., "Dibenzylzirconium complexes of chelating aminodiolates . . . ", Organometallics (2000), pp. 509-529, vol. 19(4).

Arriola et al., "Catalytic production of olefin block copolymers via chain shuttling polymerization", Science (2006), pp. 714-719, vol. 312.

International Search Report (PCT/US2006/061761), dated Aug. 1, 2007.

International Search Report (PCT/US2008/066735), dated Sep. 24, 2008.

* cited by examiner

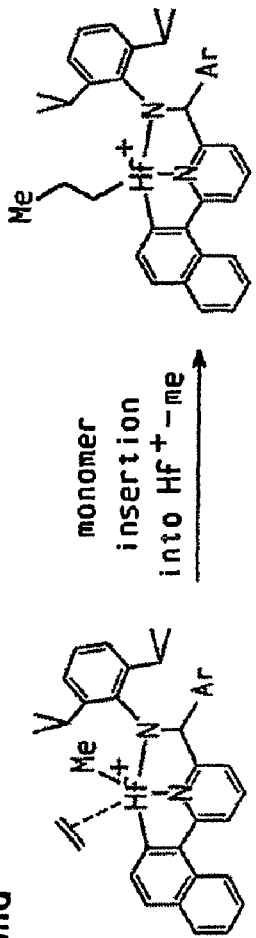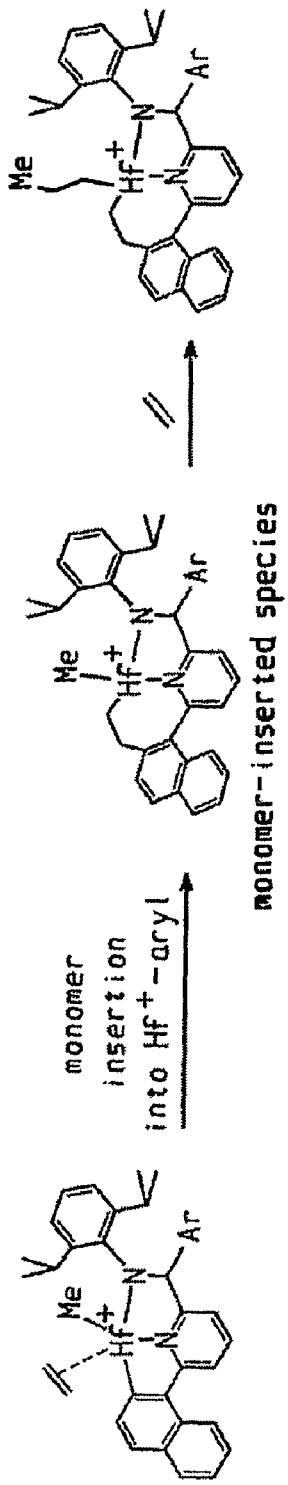
Fig. 4

Summary and Conclusions From Pyridylamide Chemistry

Pyridylamide Catalysts ARE NOT Single Site in Copolymerizations
- Ethylene/octene copolymers have bimodal molecular weight distributions
- Activation chemistry complicated with protic cocatalysts, but does not explain the observed multi-site behavior New Active Sites Proposed From Single Insertion into Hf-aryl bond
- Mechanism supported by DFT calculations
- Up to 10 active sites possible in ethylene/α-olefin copolymerization Evidence Suggests Aryl-Inserted Species are the Active Catalysts
- Insertion of $^{13}$c-ethylene observed via low temperature NMR
- Ligand with appended 4MP1 isolated and characterized by X-ray
- Quench of "living" PE shows more monomer-inserted species in polymer
- Polymer bimodality strongly correlated to reactor monomer composition

*Fig. 14*

DSC Trace of Example 4

DSC Trace of Example 6

DSC Trace of Example 12

DSC Trace of Example 14

DSC Trace of Example 15

Figure 21. Effect of octene mole fraction on the fraction of high molecular weight polymer.

PROCESSES OF CONTROLLING MOLECULAR WEIGHT DISTRIBUTION IN ETHYLENE/ALPHA-OLEFIN COMPOSITIONS

CROSS-REFERENCE TO RELATED APPLICATIONS

This application claims priority to U.S. Provisional Application No. 60/749,308, filed Dec. 9, 2005. For purposes of United States patent practice, the contents of the provisional applications are herein incorporated by reference in their entirety.

FIELD OF THE INVENTION

The present invention relates to compositions and processes of making ethylene/α-olefin polymer compositions. More particularly, the invention relates to processes of producing ethylene/α-olefin compositions having a controlled molecular weight distribution.

BACKGROUND AND SUMMARY OF THE INVENTION

It is desirable to produce ethylene/α-olefin compositions of controlled molecular weight distribution in a cost-effective manner. In particular ethylene/α-olefin compositions having a multi-modal (two or more modes wherein the case of two may interchangeably be referred to as bimodal or multi-modal) molecular weight composition distribution are often desirable for some applications, for example, pipes for natural gas, sewers, mining, etc. Also, some applications may require compositions wherein a low molecular weight portion of said ethylene/α-olefin interpolymer composition has a higher density than a high molecular weight portion of said ethylene/α-olefin interpolymer composition. Unfortunately, to date the available processes do not effectively and efficiently control the distribution or result in compositions with the desired density and molecular weight combinations.

New processes have been discovered which result in effective control of molecular weight distribution. Advantageously, the inventive processes may be designed to result in compositions wherein a low molecular weight portion of said ethylene/α-olefin interpolymer composition has a higher density than a high molecular weight portion of said ethylene/α-olefin interpolymer composition. Also, the ethylene/α-olefin interpolymer composition may be produced in a single polymerization reactor and/or using a single catalyst. Novel compositions often may result from the aforementioned processes. Said novel compositions comprise an ethylene/alpha-olefin interpolymer composition with a multi-modal molecular weight distribution and one or more molecules having a gram molecular weight equal to about ((the molecular weight of an aryl or hydrocarbyl-ligand of a pre-catalyst)+28+ 14*X), wherein X represents an integer from zero to 10, preferably zero to 8.

BRIEF DESCRIPTION OF THE DRAWINGS

FIGS. 1-14 are a series of slides explaining multi-site behavior in copolymerizations.

DETAILED DESCRIPTION OF THE INVENTION

General Definitions

Figure 1:
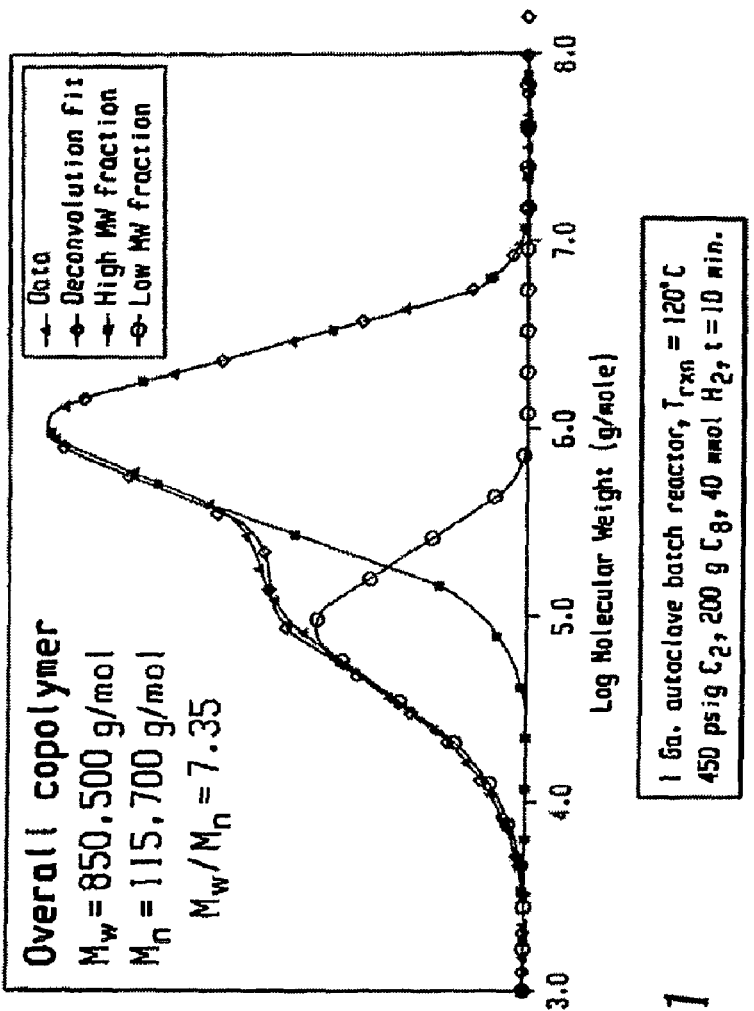
Figure 2:
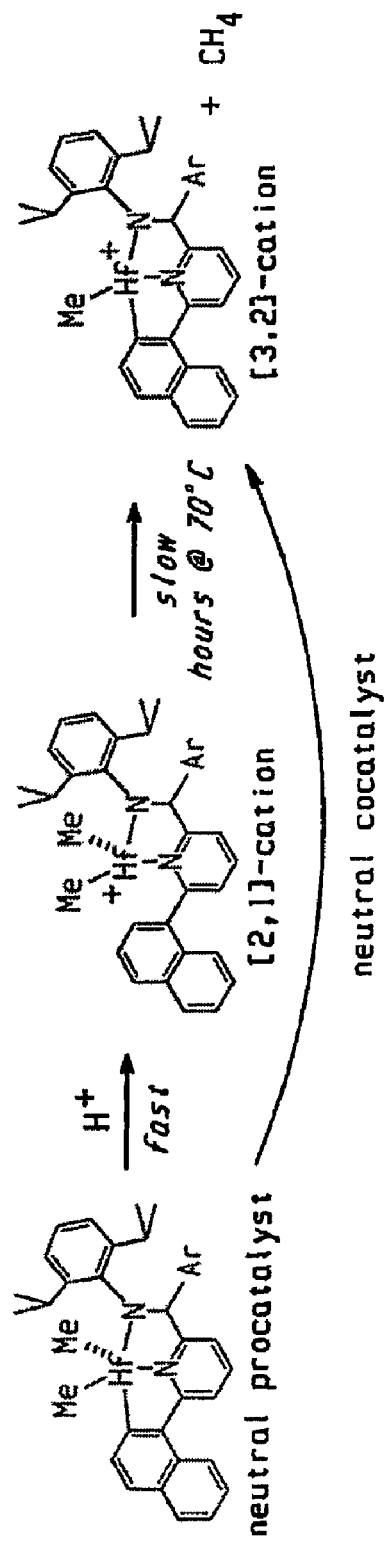
Figure 3:
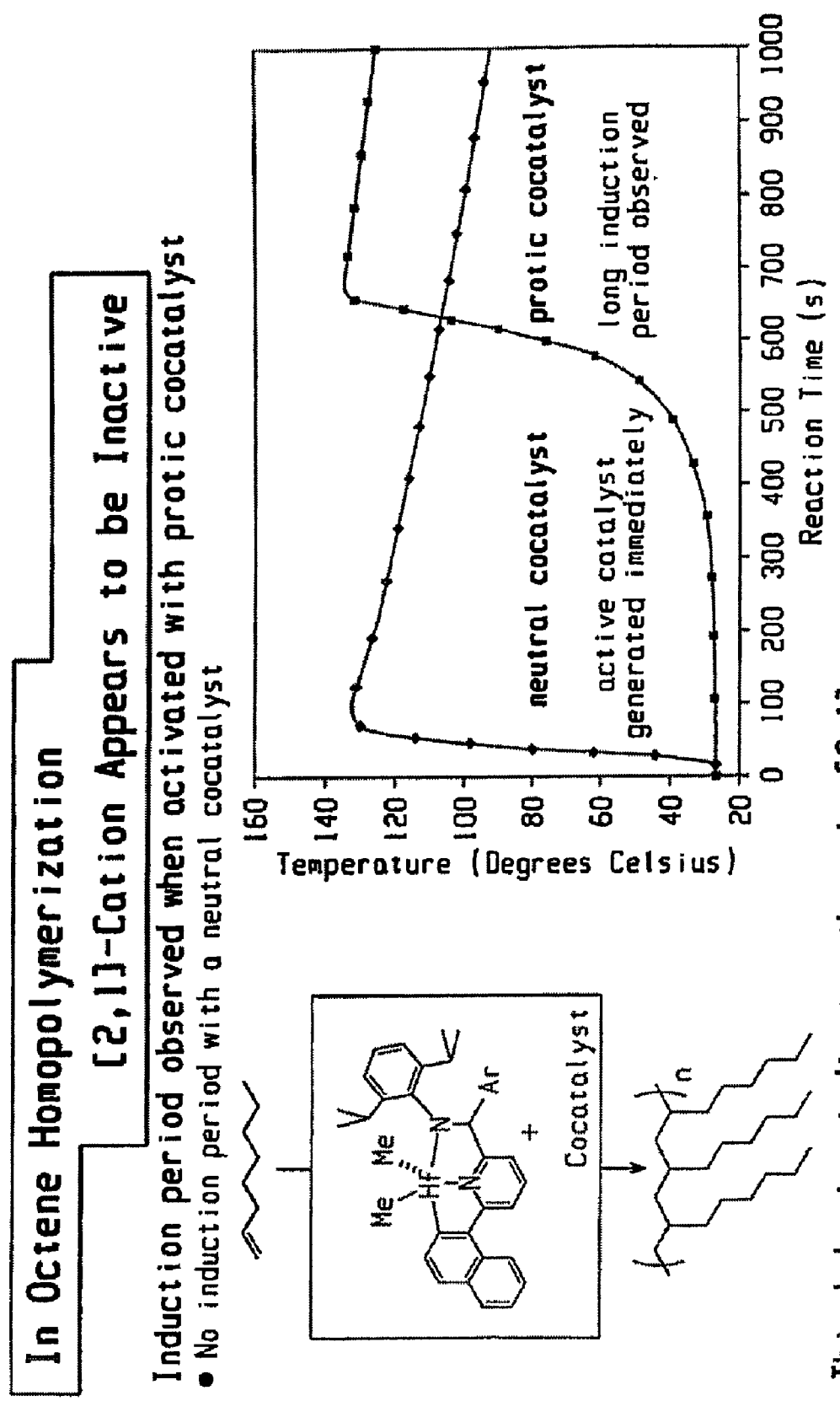
Figure 5:
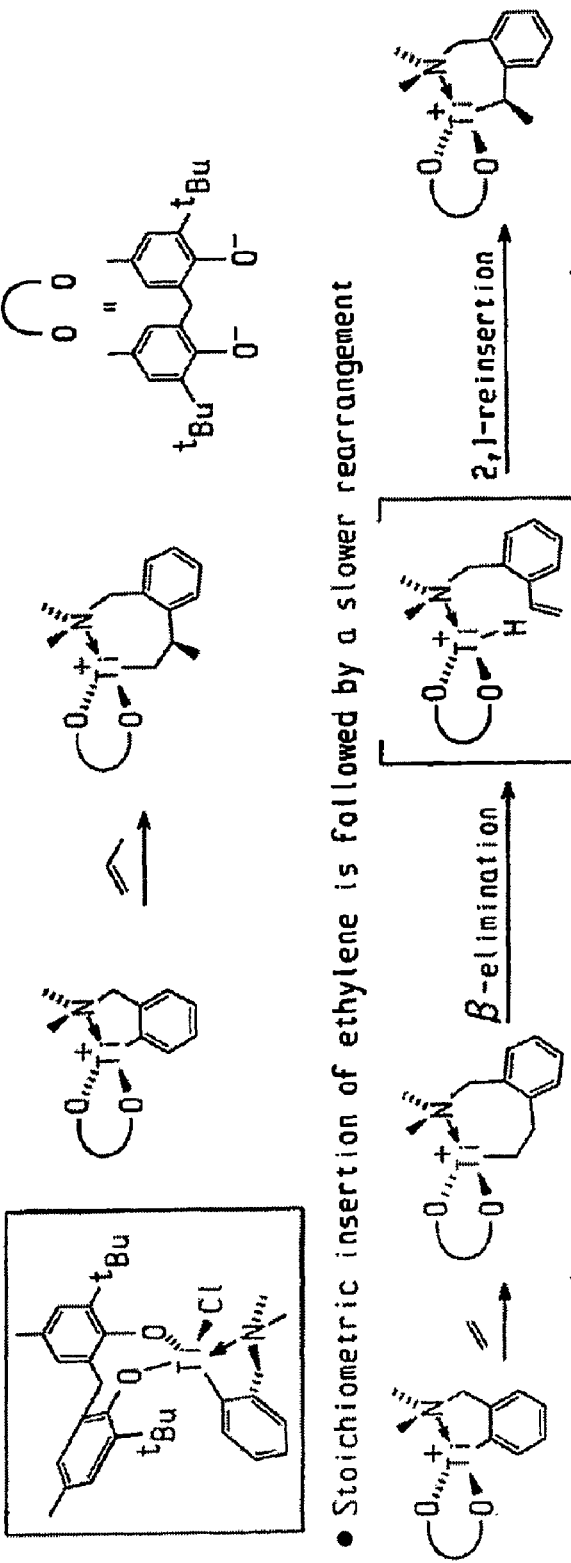
Figure 6:
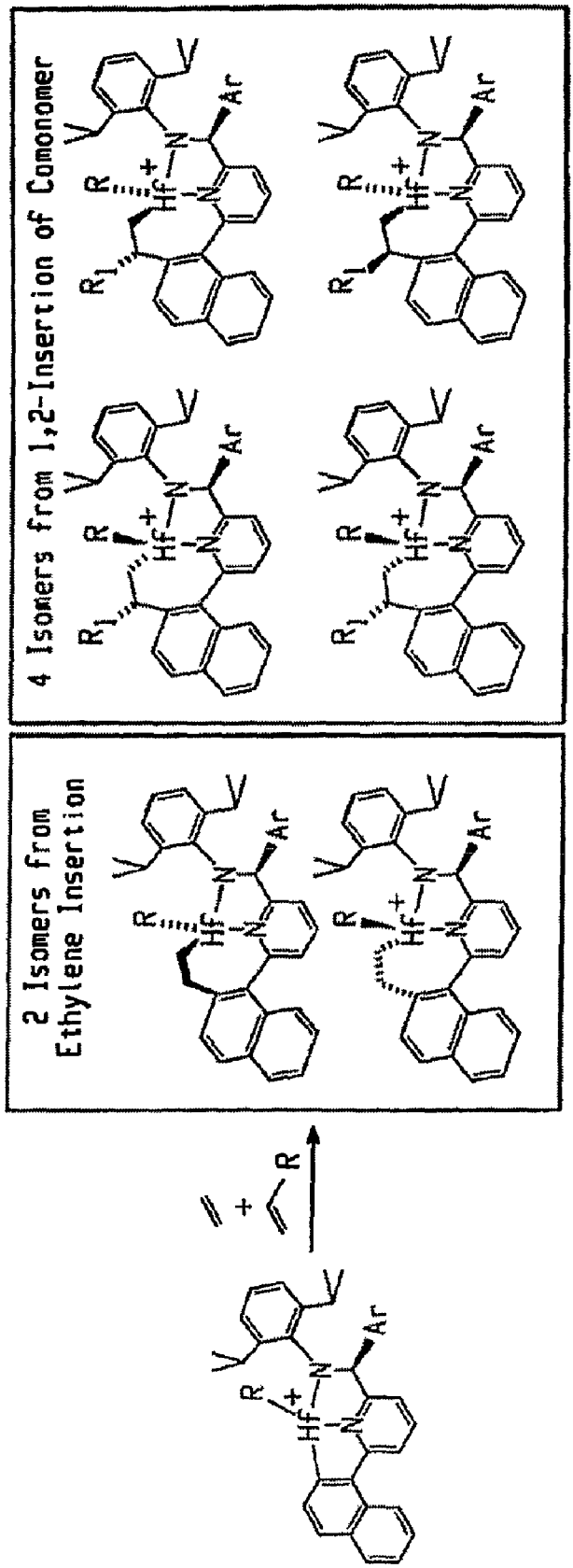
Figure 7:
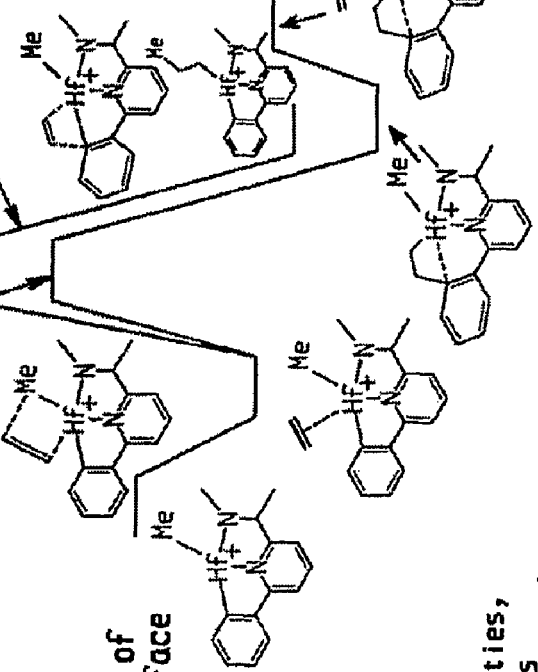
Figure 8:
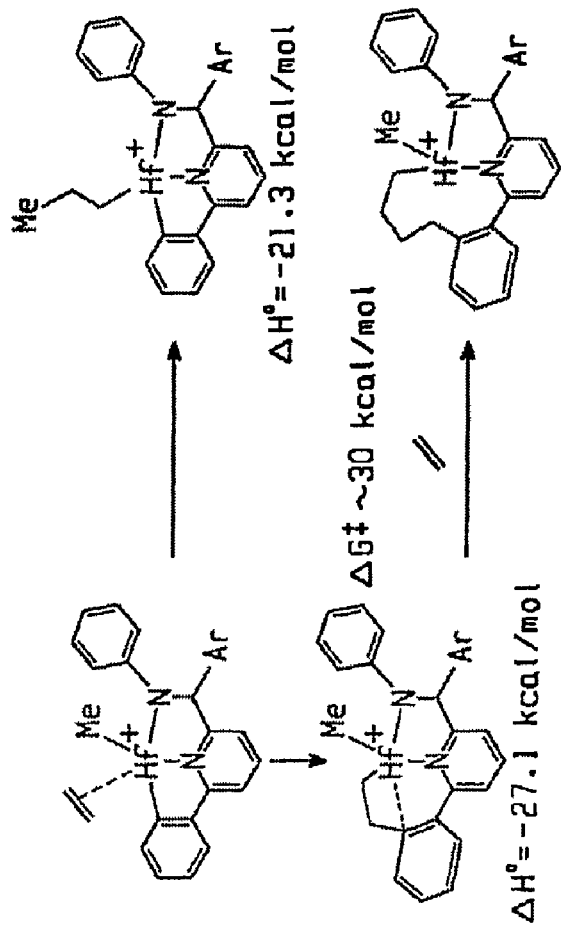
Figure 9:
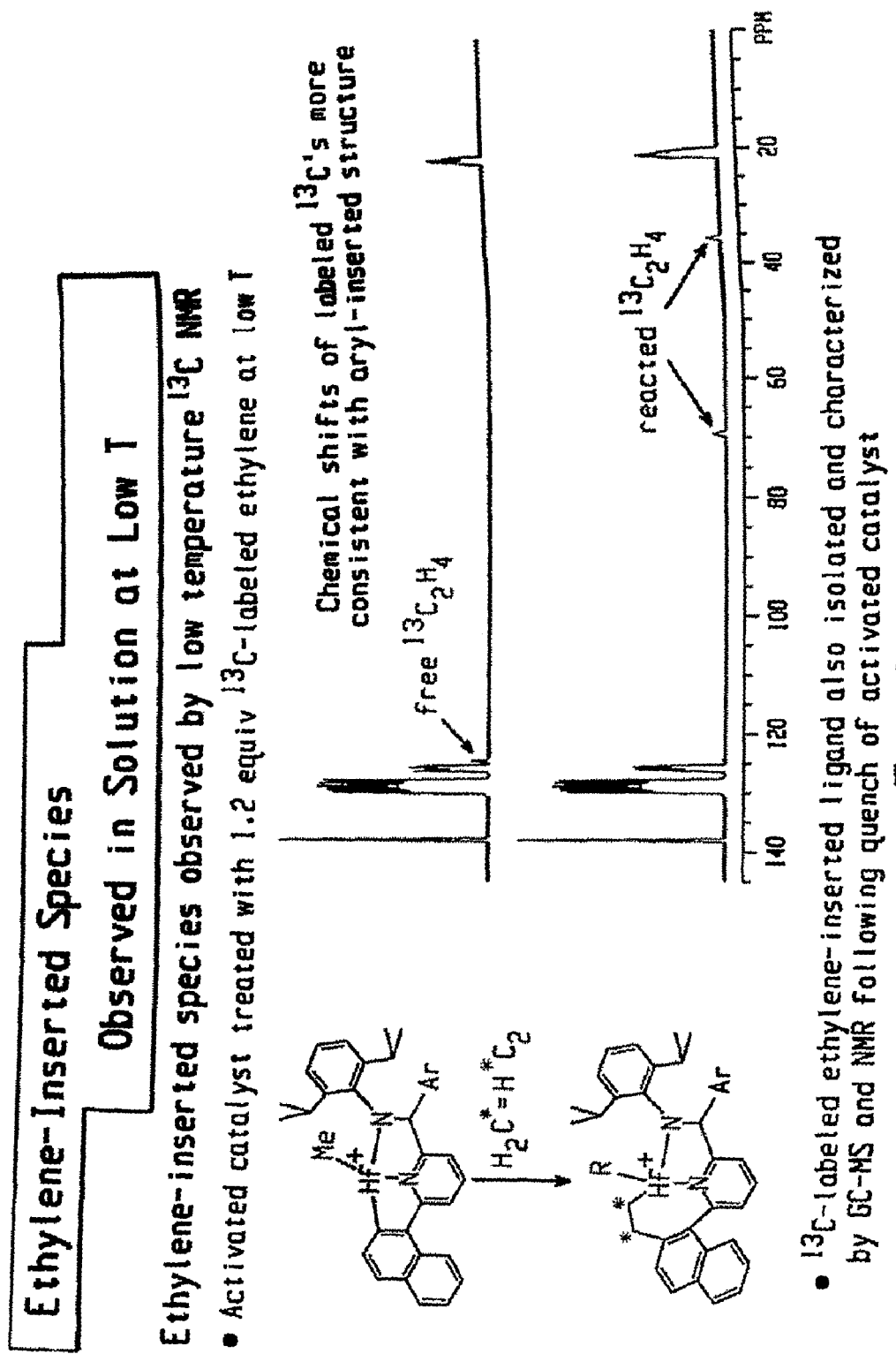
Figure 10:
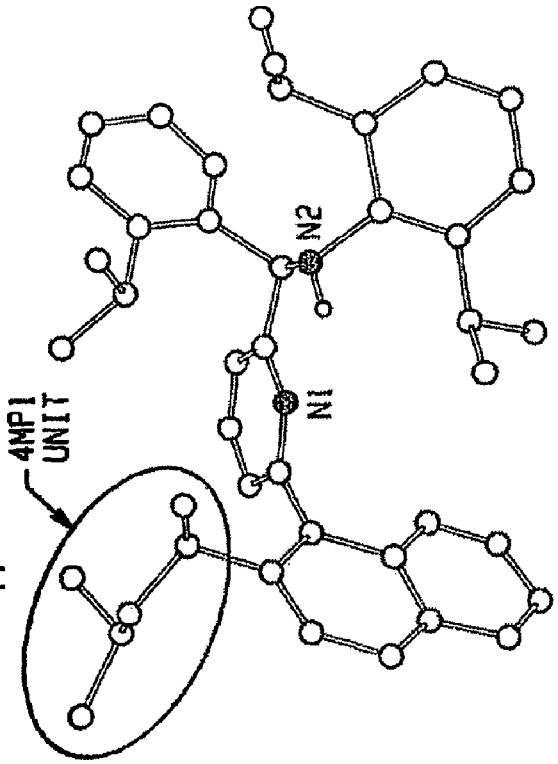
Figure 11:
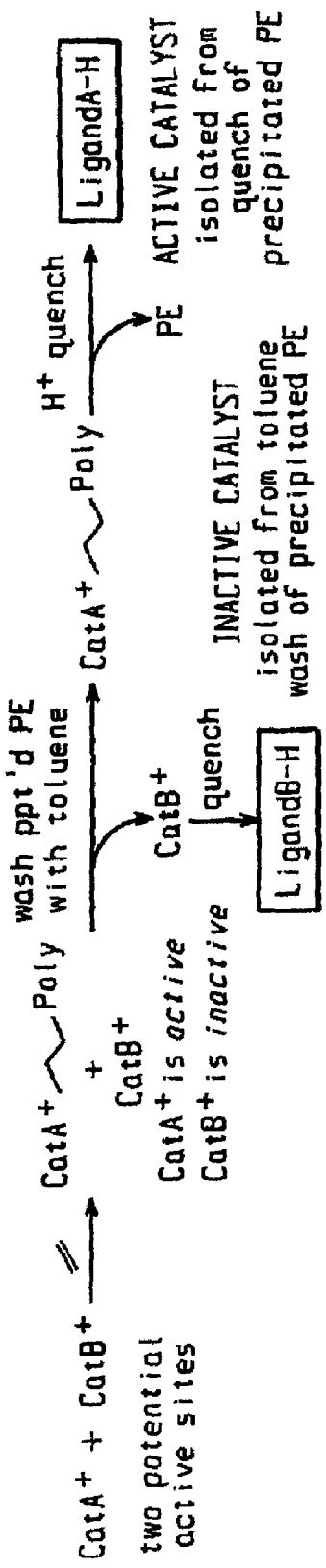
Figure 12:
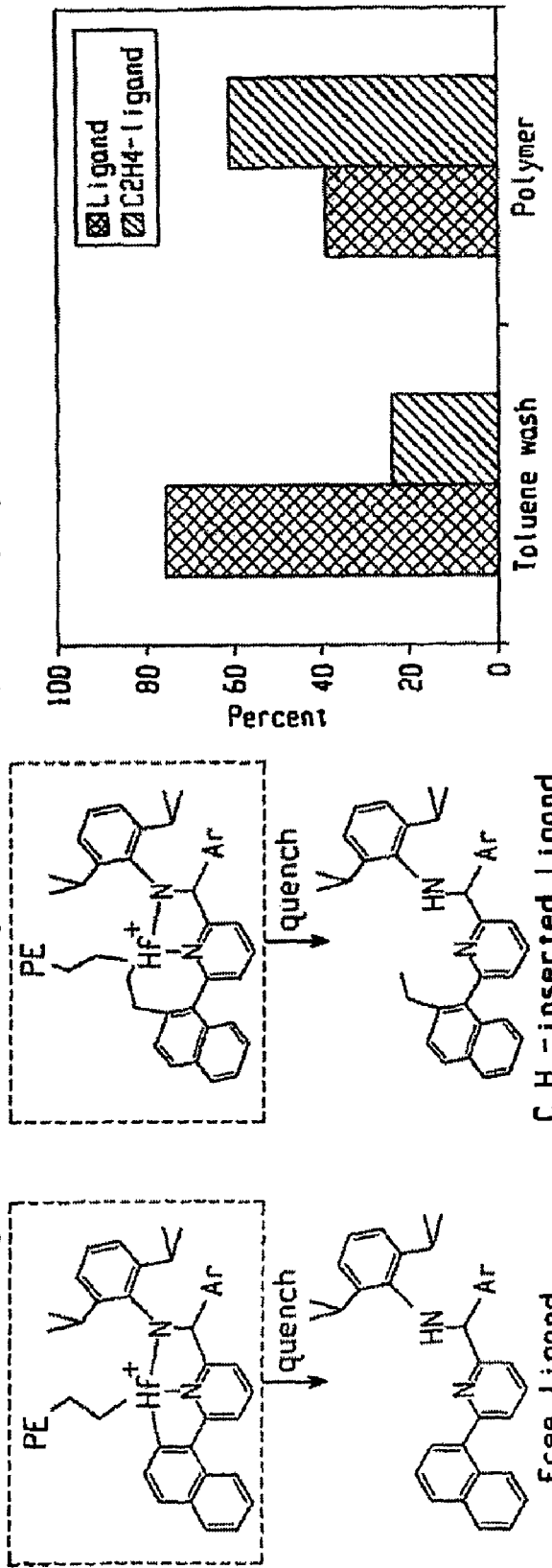
Figure 13:
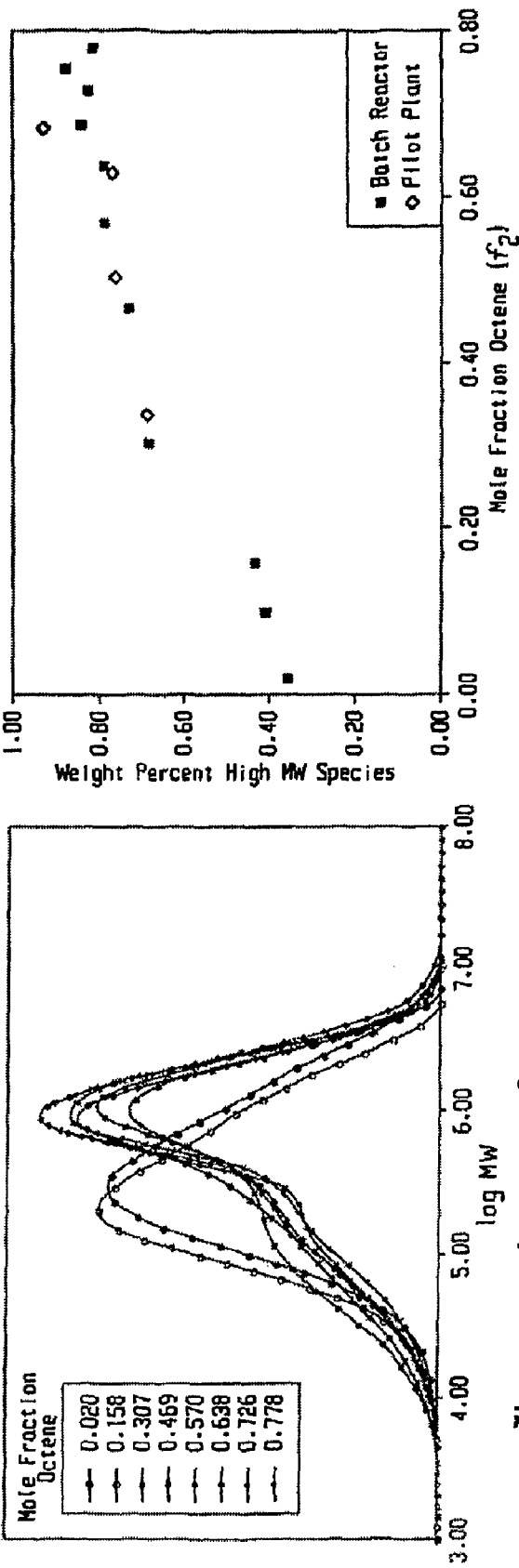
Figure 15:
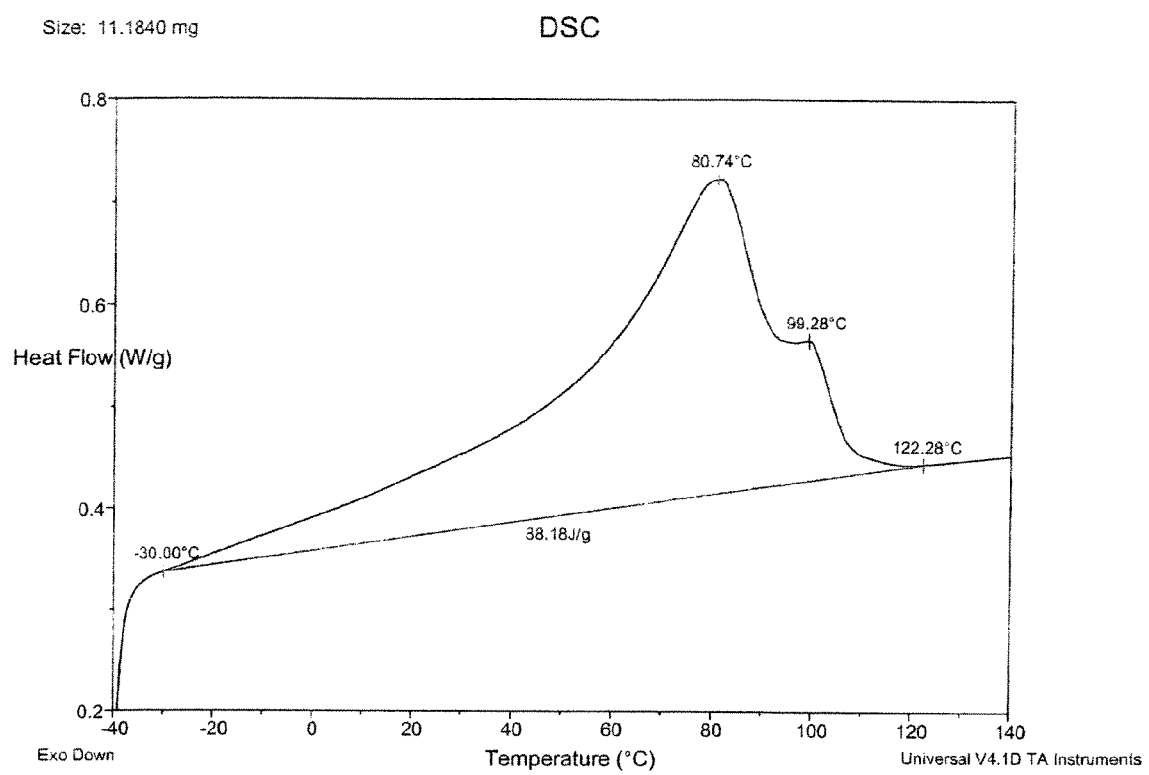
FIGS. 15-19 are differential calorimetry scans (DSC) for polymer made from Examples 4, 6, 12, 14 and 15, respectively.
Figure 16:
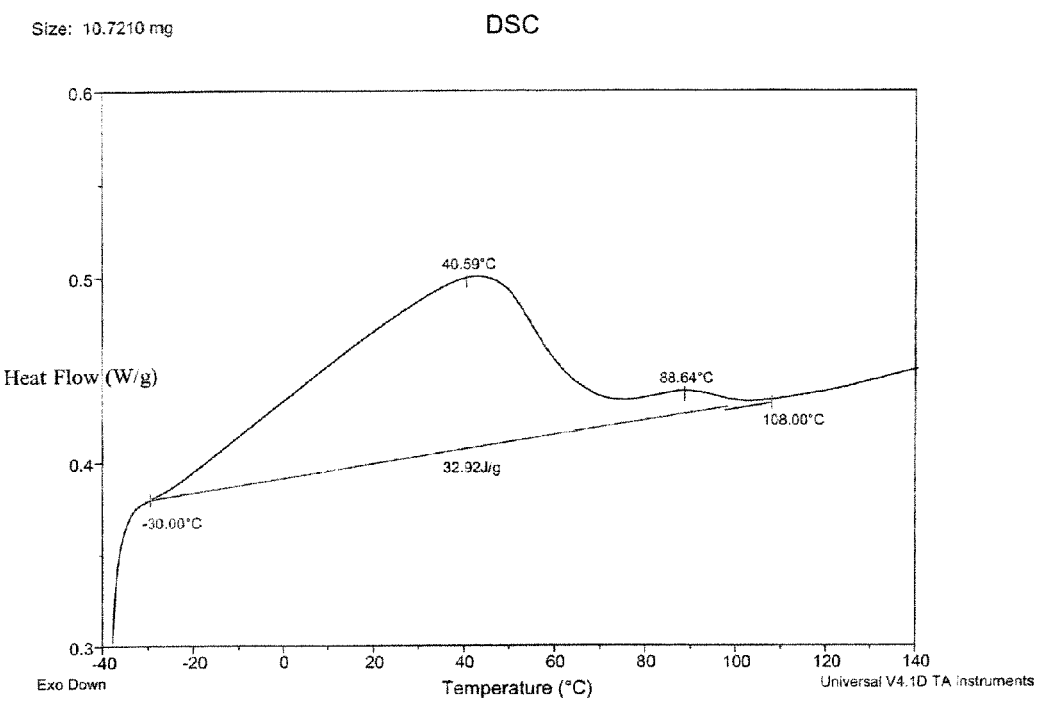
Figure 17:
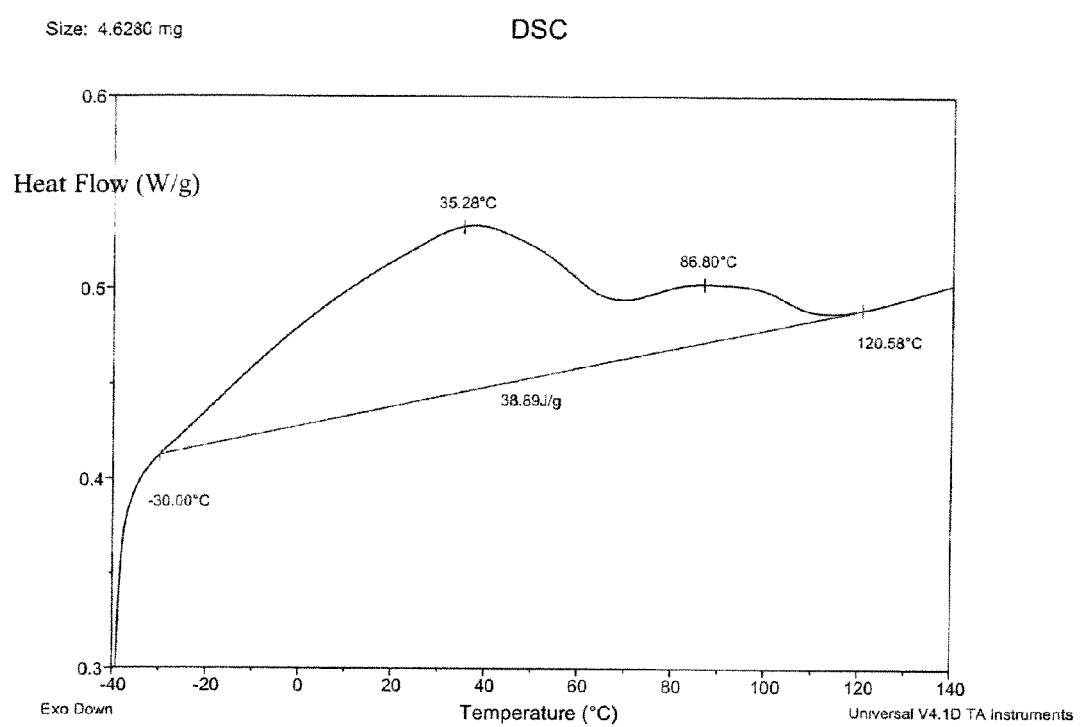
Figure 18:
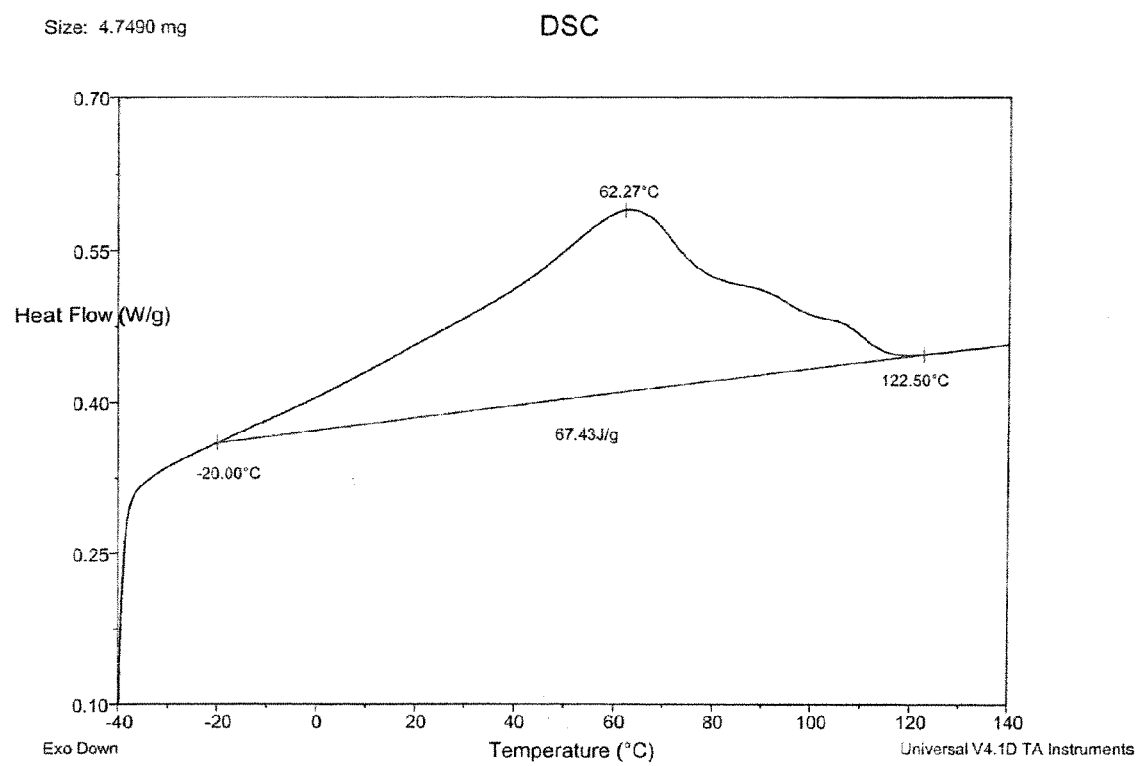
Figure 19:
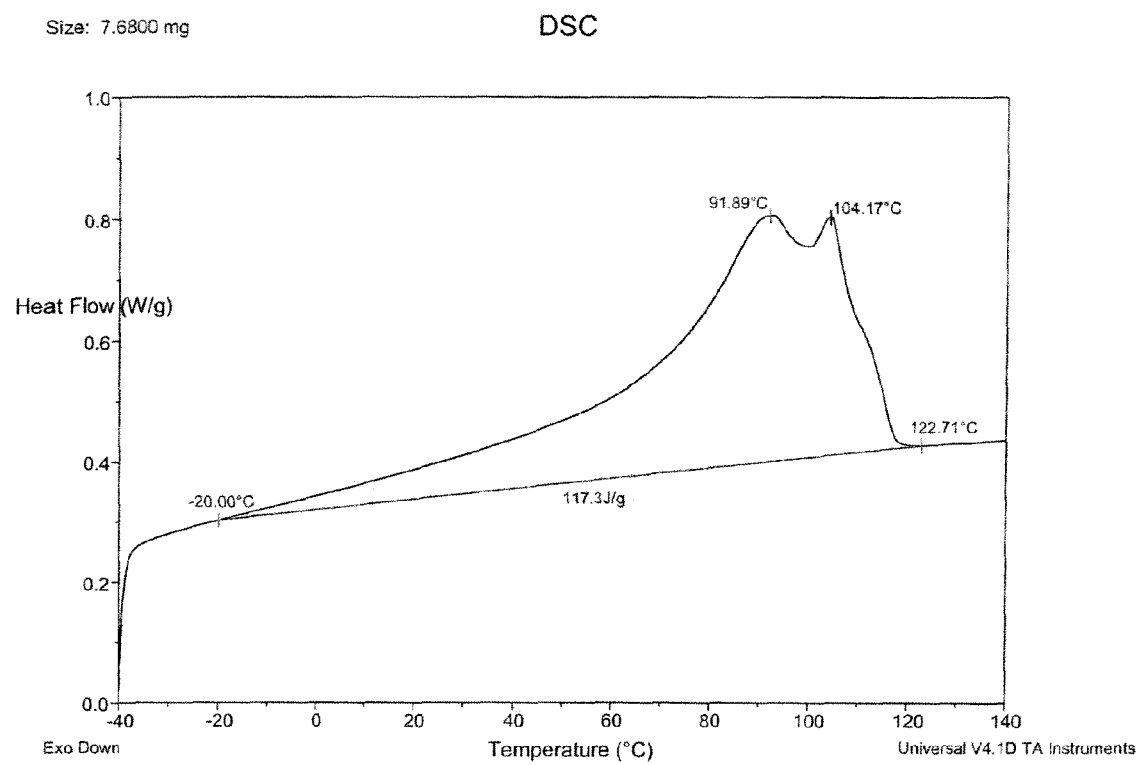

If and when employed herein the following terms shall have the given meaning for the purposes of this invention:

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the multi-block polymers often possess PDI from 1.7 to 2.9, preferably from 1.8 to 2.5, more preferably from 1.8 to 2.2, and most preferably from 1.8 to 2.1.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

"Density" is tested in accordance with ASTM D792.

"Melt Index ($I_2$)" is determined according to ASTM D1238 using a weight of 2.16 kg at 190° C. for polymers comprising ethylene as the major component in the polymer.

"Melt Flow Rate (MFR)" is determined for according to ASTM D1238 using a weight of 2.16 kg at 230° C. for polymers comprising propylene as the major component in the polymer.

"Molecular weight distribution" or MWD is measured by conventional GPC per the procedure described by Williams, T.; Ward, I. M. *Journal of Polymer Science, Polymer Letters Edition* (1968), 6(9), 621-624. Coefficient B is 1. Coefficient A is 0.4316.

Controlling Molecular Weight and Density

It has been discovered that the molecular weight distribution of a resulting polymer may be controlled. For example, using the proper reaction conditions (e.g., a well mixed homogeneous reaction environment, a steady-state concentration of two or more monomers such as ethylene and an α-olefin like octene, and a proper pre-catalyst or catalyst) the bimodal molecular weight "split" of the polymer may be controlled by the mole fractions (f) of the two or more monomers, n, such that the mole fraction of monomer m is defined as:

$$f_m = \frac{[Monomer_m]}{\sum_{i=1}^{n}[Monomer_i]}.$$

That is, the molecular weight split can be controlled so that it is basically a function of the relative monomer concentrations in solution. These same relative monomer concentrations also, depending upon the reaction conditions, may determine the overall composition (i.e. density) of the total polymer.

One aspect of controlling monomer purity useful herein is by utilizing a side stream of monomer in contact with a selected catalyst in a plug flow reactor. If the monomer is impure, then a lower than expected exotherm will be observed in the plug flow reactor. In this manner, monomer purity is monitored and adjusted if necessary.

While not wishing to be bound by any theory the Applicants have discovered that the reason that the monomer concentration:molecular weight split relationship can be made to occur is that a different catalyst species can be made from each monomer reactant. This means that a lower molecular weight polymer is formed by an "ethylene-inserted" form of the catalyst, while an "α-olefin-inserted" form of the catalyst gives a higher molecular weight polymer. Advantageously, this results in a molecular weight split which is controlled by controlling the relative amounts of the various catalyst species that are formed.

As an example it is believed that the Hafnium catalyst below can be made to form an ethylene-inserted cation and an octene-inserted cation in the presence of ethylene and octene and the proper reaction conditions including, for example, a well mixed homogeneous reaction environment.

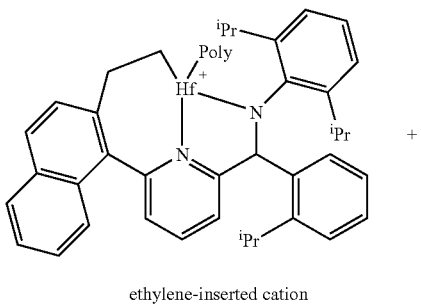

ethylene-inserted cation

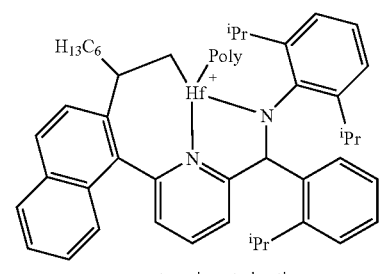

octane-inserted cation mixture of catalyst (and therefore polymer split) determined by ration of ethylene to comonomer Therefore, the present invention allows one to control the molecular weight split in numerous ways. One method of the present invention involves changing the ligand structure of a given catalyst to affect the resulting split for a given overall density copolymer. Thus, one may select suitable pre-catalyst(s) for the polymerization to control the concentrations of an ethylene-inserted cation and/or an octene-inserted cation and thereby control the resulting molecular weight split. Alternatively, the present invention allows one to control the polymer split from a given catalyst precursor. For example, one such method would be to do a pre-reaction or pre-polymerization of sorts, e.g., contacting a pre-catalyst with a single monomer to generate the desired catalyst species concentrations, then feeding part or all of this pre-reaction product to the reactor. This could optionally be done with the addition of pure pre-catalyst, providing a high degree of control over the resulting polymer bimodality.

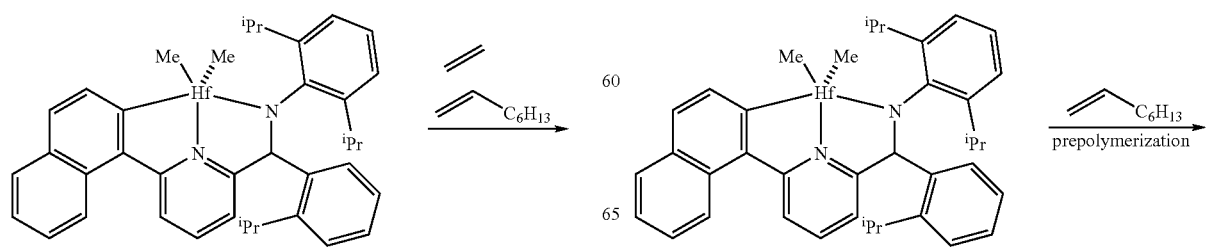

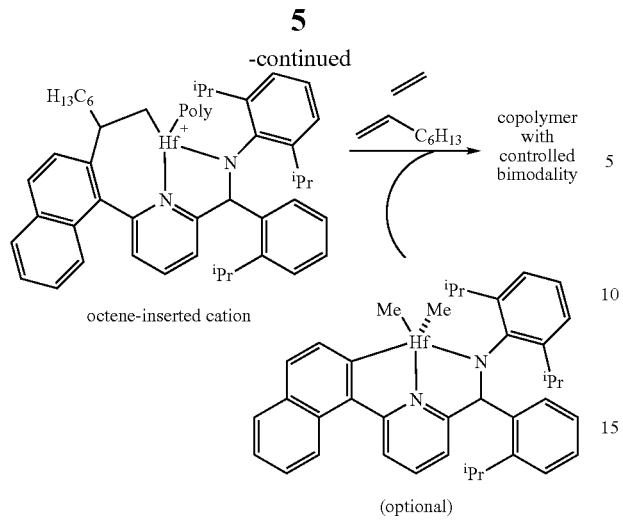

(optional)

In yet another alternative of the present invention, the polymer split can be modified by changing process variables. For example, one can control the amount of inserted catalyst by controlling composition gradients—especially in instances when the insertion occurs in the early stages of catalyst activation. In a solution loop reactor, for example, a gradient of monomer composition can be achieved by modifying the speed at which the reactor effluent circulates through the reactor. This can result in differences in the comonomer mole fraction at different places within the reactor. The reactor can be configured to take advantage of this by strategic placement of catalyst and monomer injection points and/or the timing of said catalyst and monomer contact.

In yet another alternative, one or more compounds can be synthesized directly so that the desired ratio of ethylene-inserted cation:α-olefin-inserted cation can be directly controlled.

General Processes of Using a Pre-Catalyst to Control Molecular Weight

As stated above, the Applicants have discovered a number of ways to control the molecular weight distribution in the production of an ethylene/α-olefin interpolymer composition. One process comprises:
(a) selecting at least one suitable pre-catalyst comprising at least one metal-aryl or metal-hydrocarbyl bond, wherein each pre-catalyst molecule is essentially the same as every other pre-catalyst molecule;
(b) contacting ethylene, at least one α-olefin, and said suitable pre-catalyst;
(c) selecting ethylene:alpha-olefin concentration ratios sufficient to activate the pre-catalyst, and
(d) forming an ethylene/α-olefin interpolymer composition under continuous reaction polymerization conditions; and, optionally,
(e) selecting a molecular weight split of the interpolymer as determined by the mole fractions (f) of the two or more monomers, n, such that the mole fraction of monomer m is defined as:

$$f_m = \frac{[Monomer_m]}{\sum_{i=1}^{n}[Monomer_i]}.$$

to produce an ethylene/α-olefin interpolymer composition with a controlled bimodal or multi-modal molecular weight distribution.

Another process comprises:
(a) selecting at least one suitable pre-catalyst comprising at least one metal-aryl or metal-hydrocarbyl bond, wherein each pre-catalyst molecule is essentially the same as every other pre-catalyst molecule;
(b) contacting at least one organic compound, and said suitable pre-catalyst;
(c) selecting at least one organic compound concentration sufficient to activate the pre-catalyst, and
(d) forming an ethylene/α-olefin interpolymer composition under continuous reaction polymerization conditions; and, optionally,
(e) selecting a molecular weight split of the interpolymer as determined by the concentration of the one or more organic compound(s) to produce an ethylene/α-olefin interpolymer composition with a controlled bimodal or multi-modal molecular weight distribution.

Suitable Pre-Catalyst Contact With (1) Ethylene and an α-Olefin or (2) Organic Compound The suitable pre-catalysts may be selected from any of those comprising at least one metal-aryl or metal-hydrocarbyl bond. The aryl may be any molecule or ligand which has the ring structure characteristic of, for example, phenyl, naphalenyl, phenanthrenyl, anthracenyl, etc. The hydrocarbyl may be any molecule or ligand comprising hydrogen and carbon such as benzyl. Additionally, a heteroatom such as nitrogen, oxygen, etc. may be substituted for one or more carbon atoms of the aryl or hydrocarbyl such that aryl includes heteroaryl and hydrocarbyl includes heterohydrocarbyl. Similarly, one or more hydrogens on the aryl or hydrocarbyl may be replaced with any substituent which does not substantially interfere with the desired activity of the pre-catalyst. Such substituents include, but are not limited to, substituted or unsubstituted alkyl, halo, nitro, amino, alkoxy, aryl, aliphatic, cycloaliphatic, hydroxy, and the like. Preferably each pre-catalyst molecule is essentially the same as every other pre-catalyst molecule. By this is meant that the chemical structures of the molecules are substantially the same. Also preferable are those structures in which ring strain is capable of being relieved from the metal-hydrocarbyl ligand when contacted with ethylene or an α-olefin.

Particularly suitable pre-catalysts are selected from the group consisting of hydrocarbylamine substituted heteroaryl compounds corresponding to the formula:

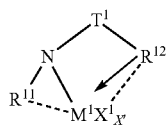

wherein:
$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;
$T^1$ is a divalent bridging group of from 1 to 41 atoms other than hydrogen, preferably 1 to 20 atoms atoms other than hydrogen, and most preferably a mono- or di-$C_{1-20}$ hydrocarbyl substituted methylene or silane group; and
$R^{12}$ is a $C_{5-20}$ heteroaryl group containing Lewis base functionality, especially a pyridin-2-yl- or substituted pyridin-2-yl group or a divalent derivative thereof;
$M^1$ comprises hafnium or other Group 4 metal;
$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively, or a mixture thereof, in contact with a suitable co-catalyst.

The pre-catalyst and optional catalysts if desired are contacted with either (1) ethylene and an α-olefin or (2) an organic compound such as, for example, acetone or a mixture of ketones or (3) mixtures thereof, in a manner and in amounts sufficient to activate the pre-catalyst. One skilled in the art will recognize that a cocatalyst such as the ones described below may be useful at this stage or a later stage. The conditions will generally vary depending upon the polymer desired and the equipment employed. However, one skilled in the art can readily determine the suitable conditions using the instant specification, background knowledge, the prior art, and routine experimentation. Guidance is given in, for example, U.S. Pat. Nos. 6,960,635; 6,946,535; 6,943,215; 6,927,256; 6,919,407; and 6,906,160 which are incorporated herein by reference. One advantage of the instant processes is that a single catalyst may be employed in a single reactor.

The ethylene, α-olefin, and/or organic compound concentrations are typically selected so as to be sufficient to activate the pre-catalyst, and form the desired ethylene/α-olefin interpolymer composition having the desired molecular weight distribution. These activation conditions vary depending on the reactants and equipment employed and may be the same but are preferably different than the continuous polymerization reaction conditions used to form the interpolymer. More specifically, the initial monomer ratio used during activation may be the same but is preferably different than the monomer ratio used during the interpolymer polymerization. While these ratios often vary according the reaction conditions and the product desired, the molecular weight split of the interpolymer may usually be controlled by selecting the mole fractions (f) of the two or more monomers, n, such that the mole fraction of monomer m is defined as:

$$f_m = \frac{[Monomer_m]}{\sum_{i=1}^{n} [Monomer_i]}.$$

Advantageously, the resulting polymer often has a low molecular weight portion that has a higher density than the high molecular weight portion. While batch or continuous polymerization reaction conditions may be employed, it is preferable to employ continuous polymerization reaction conditions during the formation of the interpolymer. However, continuous polymerization reaction conditions can still be employed even if the pre-catalyst is activated separately from the main polymerization.

General Processes of Using a Synthesized Catalyst to Control Molecular Weight Distribution Another process of controlling molecular weight comprises contacting ethylene, an α-olefin, and a suitable catalyst under reaction conditions sufficient to form an ethylene/α-olefin interpolymer composition wherein the catalyst comprises a catalytic amount of a molecule having the structure:

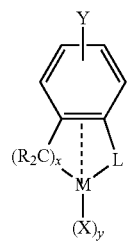

wherein

M=group 2-8 metal, preferably group 4 as a neutral or charged moiety;

Y=any substituent including fused rings;

L=any ligating group, especially a pyridyl or pyridylamide;

X=alkyl, aryl, substituted alkyl, H or hydride, halide, or other anionic moiety;

y=an integer from 0 to the complete valence of M;

R=alkyl, aryl, haloalkyl, haloaryl, hydrogen, etc;

x=1-6, especially 2;

Dashed line=optional bond, especially a weak bond; and

X and $(CR_2)_x$ may be tethered or part of a ring.

Use of various forms of the aforementioned catalyst structure allows one skilled in the art to directly control the concentrations of an "ethylene-inserted" form of the catalyst and an "α-olefin-inserted" form of the catalyst. By directly controlling these concentrations the molecular weight split of the interpolymer may be controlled. This allows one skilled in the art to employ a much wider range of reaction conditions yet still control the molecular weight distribution. For example, it is then possible to control the molecular weight distribution over a wider range of monomer concentrations.

The above catalyst may be synthesized by any convenient method.

Catalyst Structures

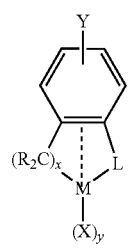

Possible synthesis methods include coupling such as

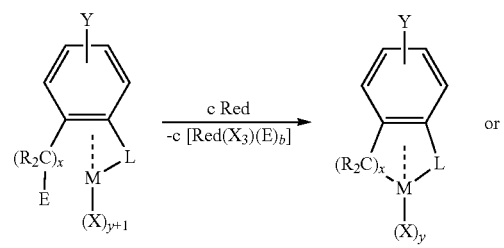

-continued

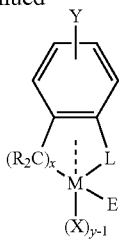

Insertion such as

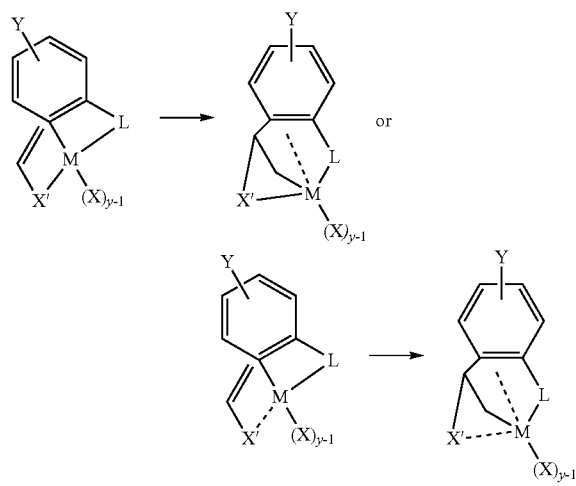

or by cyclometalation such as

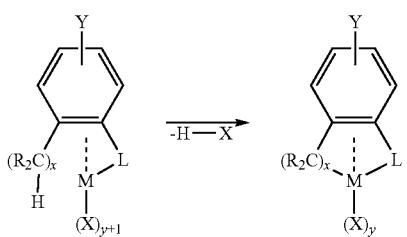

wherein
M=group 2-8 metal, preferably group 4 as a neutral or charged moiety.
Y=any substituent including fused rings.
L=any ligating group, especially a pyridyl or pyridylamide.
X=alkyl, aryl, substituted alkyl, H or hydride, halide, or other anionic moiety.
y=number to complete valence of M.
R=alkyl, aryl, haloalkyl, haloaryl, hydrogen, etc.
x=1-6, especially 2.
Dashed line=optional bond, especially a weak bond.
X and $(CR_2)_x$ may be tethered or part of a ring.
E=any anionic moiety, (including alkyl or aryl) or H of a C—H unit
Red=reducing agent
a+b=number to complete the valence of Red when oxidized
c=number of equivalents of Red required to join $(CR_2)_x$ to M As one skilled in the art can appreciate it may also be desirable in some situations to use an in-situ synthesis method such that the catalyst is formed during the polymerization reaction.

Cocatalysts

As one skilled in the art will appreciate it may be useful to combine the pre-catalyst or synthesized catalyst with a suitable cocatalyst, preferably a cation forming cocatalyst, a strong Lewis acid, or a combination thereof. In a preferred embodiment, the shuttling agent, if employed, is employed both for purposes of chain shuttling and as the cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, leador silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. No. 5,153,157, U.S. Pat. No. 5,064,802, U.S. Pat. No. 5,321,106, U.S. Pat. No. 5,721,185, U.S. Pat. No. 5,350,723, U.S. Pat. No. 5,425,872, U.S. Pat. No. 5,625,087, U.S. Pat. No. 5,883,204, U.S. Pat. No. 5,919,983, U.S. Pat. No. 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived there from, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_g^+(A)^{g-}$$

wherein:
L* is a neutral Lewis base;
$(L^*-H)^+$ is a conjugate Bronsted acid of L*;
$A^{g-}$ is a noncoordinating, compatible anion having a charge of g-, and
g is an integer from 1 to 3.

More preferably $A^{g-}$ corresponds to the formula: $[M'Q_4]^-$;
wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl- perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(BQ_4)^-;$$

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred $(L^*-H)^+$ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

$$(Ox^{h+})_g(A^{g-})_n,$$

wherein:
$Ox^{h+}$ is a cationic oxidizing agent having a charge of h+;
h is an integer from 1 to 3; and
$A^{g-}$ and g are as previously defined.

Examples of cationic oxidizing agents include: ferrocenium, hydrocarbyl-substituted ferrocenium, $Ag^+$, or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$[C]^+A^-$$

wherein:

[C]⁺ is a $C_{1-20}$ carbenium ion; and

A⁻ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$(Q^1{}_3Si)^+A^-$$

wherein:

$Q^1$ is $C_{1-10}$ hydrocarbyl, and A⁻ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl) aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

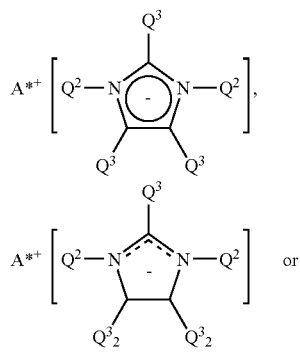

or

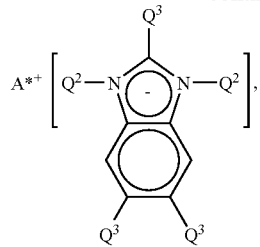

wherein:

A*⁺ is a cation, especially a proton containing cation, and preferably is a trihydrocarbyl ammonium cation containing one or two $C_{10-40}$ alkyl groups, especially a methyldi($C_{14-20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and bis(tris(pentafluorophenyl)alumane)-5,6-bis(undecyl)benzimidazolide.

Other activators include those described in PCT publication WO 98/07515 such as tris(2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775. All of the foregoing catalyst activators as well as any other know activator for transition metal complex catalysts may be employed alone or in combination according to the present invention, however, for best results alumoxane containing cocatalysts are avoided.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

Novel Compositions of the Present Invention

Advantageously, novel compositions of the present invention comprise an ethylene/alpha-olefin interpolymer composition with a multi-modal molecular weight distribution and one or more molecules having a gram molecular weight equal to about ((the molecular weight of an aryl or hydrocarbyl-ligand of a pre-catalyst)+28+14*X), wherein X represents an integer from zero to 10, preferably zero to 8. The aryl or hydrocarbyl ligand may be any of those described herein. The molecule may be observed in the composition by extracting the interpolymer with a solvent such as methylene chloride, adding another solvent such as an alcohol, e.g. ethanol, and decanting. The decantate can then be analyzed by any convenient analytical method such as gas chromatography coupled with mass spectroscopy. Said composition may also contain ethylene, an α-olefin, a reaction product or a mixture thereof.

Other novel compositions of the present invention include the catalyst which may be synthesized as described above optionally mixed with ethylene, an α-olefin, a reaction product or a mixture thereof.

Ethylene/α-olefin Multi-Block Interpolymer Component(s)

The general processes described above may also be used to produce an ethylene/α-olefin multi-block interpolymer such as those describe in, for example, copending U.S. application Ser. No. 11/376,835 filed on Mar. 15, 2006, now U.S. Pat. No. 7,608,668 and PCT Publication No. WO 2005/090427, filed on Mar. 17, 2005, which in turn claims priority to U.S. Provisional Application No. 60/553,906, filed Mar. 17, 2004. For purposes of United States patent practice, the contents of the aforementioned applications are herein incorporated by reference in their entirety. If such a multi-block polymer is desired then the processes described above will also generally include a catalyst such as zinc which is different than any pre-catalyst that may be employed. In addition, a shuttling agent such as diethyl zinc or others described in PCT Publication No. WO 2005/090427 will usually be employed. Such processes will typically then result in a polymer wherein the polymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$T_m > -2002.9 + 4538.5(d) - 2422.2(d)^2$, preferably $T_m \geq 858.91 - 1825.3(d) + 1112.8(d)^2$; or (4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re>1481-1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

Applications and End Uses

The polymers of the present invention can be used in a variety of conventional thermoplastic fabrication processes to produce useful articles. Such articles include objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. The polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing. Dispersions, both aqueous and non-aqueous, can also be formed using the polymers or formulations comprising the same. Frothed foams comprising the invented polymers can also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Suitable end uses for the foregoing products include elastic films and fibers; soft touch goods, such as tooth brush handles and appliance handles; antiblocking compositions; cap liners, gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers; coated fabrics; hoses; tubing; weather stripping; cap liners; flooring; and viscosity index modifiers, also known as pour point modifiers, for lubricants.

EXAMPLES

As stated above, the bimodal molecular weight "split" of the polymer may be selected by controlling the mole fractions (f) of the two or more monomers, n, such that the mole fraction of monomer m is defined as:

$$f_m = \frac{[Monomer_m]}{\sum_{i=1}^{n} [Monomer_i]}.$$

Figure 20:
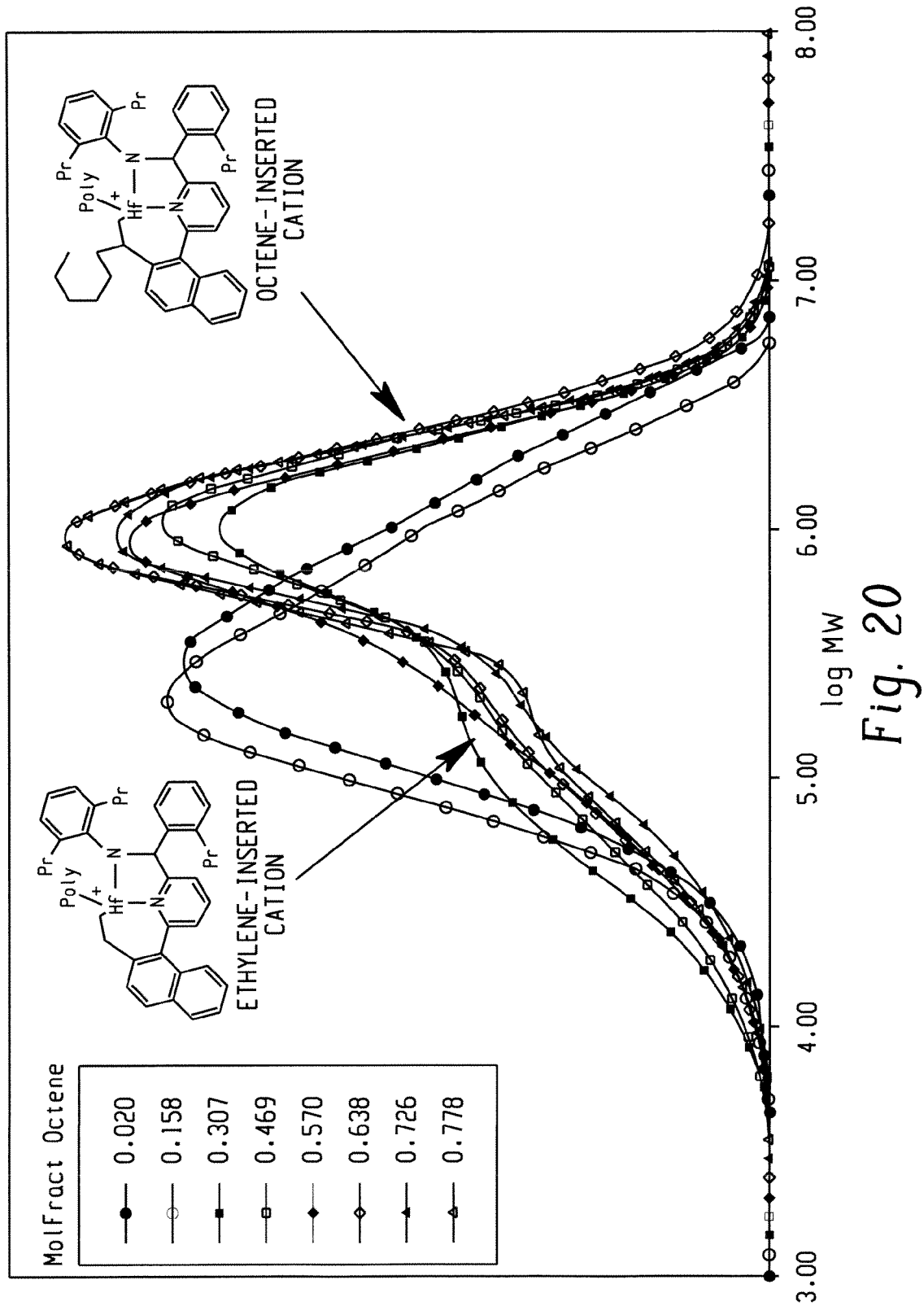
FIG. 20 depicts molecular weight distributions of ethylene-octene copolymers.
Figure 21:
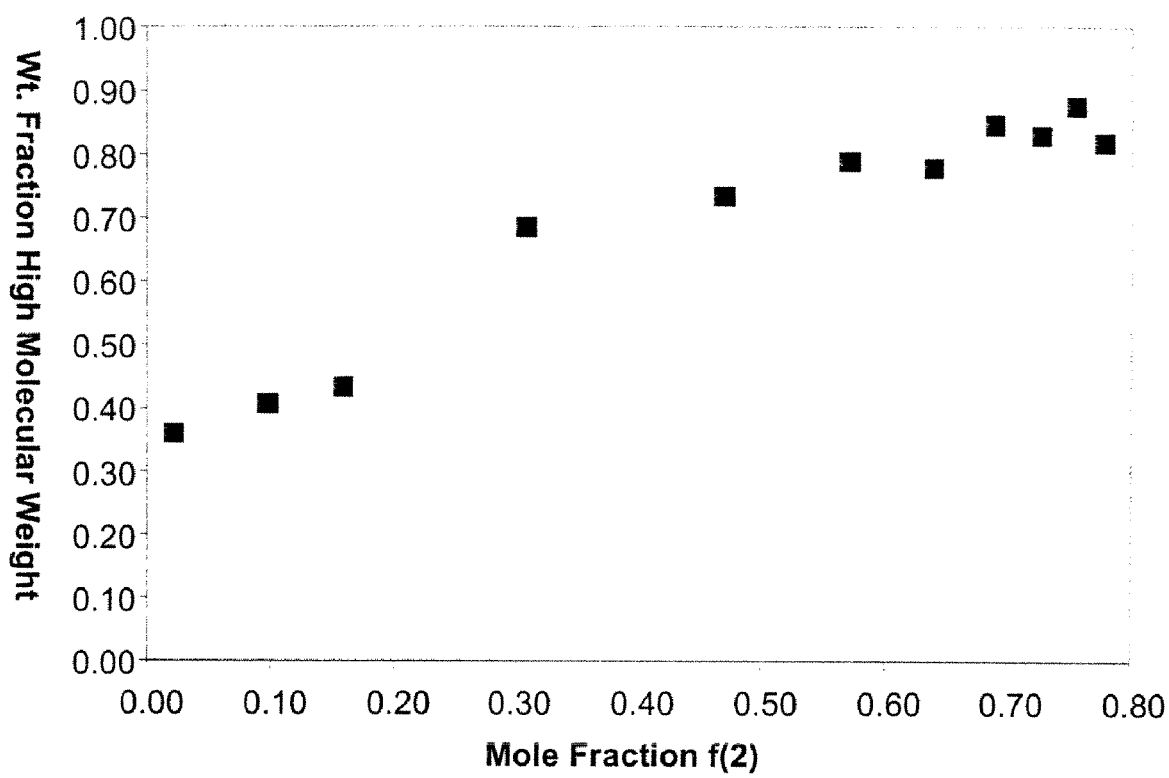
FIG. 21 depicts the effect of octene mole fraction on the fraction of high molecular weight polymer.

This may be quantified for an ethylene-octene copolymer as depicted in FIGS. 20 and 21. At low $f_2$, the low molecular weight fraction predominates, but at higher $f_2$, the higher molecular weight species is more prevalent.

General Experimental Considerations

Unless specified otherwise, all reagents are handled under anaerobic conditions using standard procedures for the handling of extremely air- and water-sensitive materials. Solvents are used without further purification. All other chemicals are commercial materials and are used as received.

General Reactor Polymerization Procedure

A 1 ga. AE autoclave is purged at high temperature with $N_2$. Isopar®E was added, and the reactor is heated to 120° C. 1-Octene and hydrogen are added batchwise to the reactor and are not regulated during the run. The reactor is the pressurized with ethylene (450 psi). Solutions of the pre-catalyst, cocatalyst (1.2 equivalents to pre-catalyst), and a scavenger (5 equivalents to pre-catalyst) are mixed and then added to the reactor using a flush of high pressure Isopar®E. Polymer yield is kept low to minimize monomer composition drift during the experiment. After the prescribed reaction time, reactor contents are dumped into a resin kettle and mixed with Irganox®1010/Irgafos®168 stabilizer mixture (1 g). The polymer is recovered by evaporating the majority of the solvent at room temperature and then dried further in a vacuum oven overnight at 90° C. Following the run, the reactor is hot-flushed with Isopar®E to prevent polymer contamination from run to run.

TABLE 1

Batch reactor ethylene/octene copolymerization with Pre-catalyst.

| Sample # | Pre-catalyst* (µmol) | Isopar ® E feed (g) | Ethylene feed (g) | Octene feed (g) | $f_2$ | Yield (g) |
|---|---|---|---|---|---|---|
| 1 | 2.0 | 1591 | 153 | 11 | 0.02 | 44 |
| 2 | 2.0 | 1550 | 151 | 56 | 0.10 | 41 |
| 3 | 2.0 | 1506 | 153 | 100 | 0.16 | 46 |
| 4 | 2.5 | 1402 | 167 | 203 | 0.31 | 26 |
| 5 | 2.5 | 1201 | 168 | 400 | 0.47 | 36 |
| 6 | 2.5 | 1009 | 170 | 605 | 0.57 | 44 |
| 7 | 3.0 | 812 | 169 | 801 | 0.64 | 66 |
| 8 | 3.0 | 611 | 165 | 1003 | 0.69 | 60 |
| 9 | 3.0 | 401 | 166 | 1202 | 0.73 | 64 |
| 10 | 3.0 | 204 | 166 | 1402 | 0.75 | 52 |
| 11 | 3.5 | 10 | 168 | 1603 | 0.78 | 84 |

$^a$Polymerization conditions: 1.2 equiv. co-catalyst, T = 120° C., 460 psig reactor pressure, 40 mmol hydrogen, t = 10 min.
*Pre-catalyst = [N-(2,6-di(1-methylethyl)phenyl)amido)(2-isopropylphenyl)(α-naphthalen-2-diyl(6-pyridin-2-diyl)methane)]hafnium dimethyl (as disclosed in U.S. application No. 20040220050) and a co-catalyst of methyldi($C_{14-18}$alkyl) ammonium salts of tetrakis (pentafluorophenyl) borate (as disclosed in U.S. Pat. No. 5,919,983)

| Example | $M_w$ (kg/mol) | $M_n$ (kg/mol) | $M_w/M_n$ |
|---|---|---|---|
| 1 | 671 | 174 | 3.86 |
| 2 | 588 | 164 | 3.59 |
| 3 | 517 | 139 | 3.71 |
| 4 | 851 | 116 | 7.35 |
| 5 | 972 | 137 | 7.10 |
| 6 | 906 | 164 | 5.51 |
| 7 | 1015 | 169 | 6.02 |
| 8 | 1108 | 232 | 4.78 |
| 9 | 1135 | 202 | 5.62 |
| 10 | 1148 | 239 | 4.81 |
| 11 | 1013 | 177 | 5.74 |

Examples 12-15

Continuous Solution Polymerization, Catalyst A1

Continuous solution polymerizations are carried out in a computer controlled autoclave reactor equipped with an internal stirrer. Purified mixed alkanes solvent (Isopar™ E available from ExxonMobil, Inc.), ethylene, 1-octene, and hydrogen (where used) are supplied to a reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

| Ex. | $C_2H_4$ kg/hr | $C_8H_{16}$ kg/hr | Solv. kg/hr | $H_2$ sccm[1] | T °C. | Pre-cat $Al^2$ ppm | Pre-cat Al Flow Kg/hr | Cocat Conc. ppm | Cocat Flow kg/hr | MMAO Conc. ppm | MMAO Flow kg/hr | Poly Rate[3] kg/hr | $f_2$ | Conv %[4] | Solids % | Eff.[5] |
|---|---|---|---|---|---|---|---|---|---|---|---|---|---|---|---|---|
| 12 | 53.6 | 31.4 | 354 | 4,470 | 120 | 600 | 0.49 | 5000 | 0.49 | 600 | 0.45 | 82.5 | 0.63 | 89.6 | 19.3 | 281 |
| 13 | 38.6 | 32.4 | 288 | 2,303 | " | " | 0.38 | " | 0.38 | " | 0.40 | 66.7 | 0.68 | 89.1 | 20.6 | 303 |
| 14 | 62.1 | 18.8 | 425 | 4,768 | " | " | 0.63 | " | 0.62 | " | 0.65 | 79.0 | 0.51 | 90.1 | 16.9 | 202 |
| 15 | 65.5 | 13.4 | 345 | 3,951 | 130 | " | 0.86 | " | 0.85 | " | 0.44 | 73.4 | 0.34 | 92.2 | 19.0 | 145 |

[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]polymer production rate
[4]percent ethylene conversion in reactor
[5]efficiency, kg polymer/g M where g M = g Hf + g Zr

TABLE 3

| Ex. | Density (g/cm$^3$) | $I_2$ | $I_{10}/I_2$ | Mw (g/mol) | Mn (g/mol) | Mw/Mn |
|---|---|---|---|---|---|---|
| 12 | 0.8650 | 1.06 | 8.36 | 130 | 26.6 | 4.90 |
| 13 | 0.8560 | 0.92 | 8.00 | 142 | 49.6 | 2.87 |
| 14 | 0.8800 | 0.76 | 7.26 | 127 | 30.3 | 4.18 |
| 15 | 0.9030 | 0.97 | 7.00 | 107 | 24.3 | 4.40 |

The ethylene-octene copolymers in FIGS. 20-21 may be made in a similar manner.

Theoretical Methods and Explanation

To support the instant invention calculations were carried out using the commercially-available software package, Gaussian98 Revision A.10 distributed by Gaussian, Inc., Pittsburgh Pa., 2001. The computations utilized the density functional theory (DFT) method, B3LYP as described in, for example, Becke, A. D. *J. Chem. Phys.* 1993, 98, 5648; Lee, C.; Yang, W.; Parr, R. G. *Phys. Rev B* 1988, 37, 785; and Miehlich, B.; Savin, A.; Stoll, H.; Preuss, H. *Chem. Phys. Lett.* 1989, 157, 200 each of which is incorporated herein by reference. In a few cases, the results were reconfirmed using conventional theory with correlation, Møller-Plesset perturbation theory to second order (MP2) as described in, for example, Møller, C.; Plesset, M. S. *Phys. Rev.* 1934, 46, 618; Head-Gordon, M.; Pople, J. A.; Frisch, M. J. *Chem. Phys. Lett.* 1988, 153, 503; Frisch, M. J.; Head-Gordon, M.; Pople, J. A. *Chem. Phys. Lett.* 1990, 166, 275; Frisch, M. J.; Head-Gordon, M.; Pople, J. A. *Chem. Phys. Lett.* 1990, 166, 281; Head-Gordon, M.; Head-Gordon, T. *Chem. Phys. Lett.* 1994, 220, 122; and Saebo, S.; Almlof, J. *Chem. Phys. Lett.* 1989, 154, 83 each of which is incorporated herein by reference. Qualitatively, the results using MP2 were similar to those for B3LYP. A series of different basis sets were used and tested. Initially the modest LANL2DZ basis set as described in, for example, Dunning, Jr., T. H.; Hay, P. J. in *Modern Theoretical Chemistry*, Ed. H. F. Schaefer, III, Plenum, N.Y., 1976, vol 3, 1; Hay, P. J. Wadt, W. R. *J. Chem. Phys.* 1985, 82, 270; Wadt, W. R; Hay, P. J. *J. Chem. Phys.* 1985, 82, 284; and Hay, P. J. Wadt, W. R. *J. Chem. Phys.* 1985, 82, 299, was used for all atoms, but progressively larger basis sets were employed such as i) LANL2DZ on the transition metal and 6-31G* on the all other atoms as described in Ditchfield, R.; Hehre, W. J.; Pople, J. A. *J. Chem. Phys.* 1971, 54, 724; Hehre, W. J.; Ditchfield, R.; Pople, J. A. *J. Chem. Phys.* 1972, 56, 2257; and Gordon, M. S. *Chem. Phys. Lett.* 1980, 76, 163 and ii) LANL2DZ on the transition metal and 6-311G** on all other atoms as described in McLean, A. D.; Chandler, G. S. *J. Chem. Phys.* 1980, 72, 5639; and Krishnan, R.; Binkley, J. S.; Seeger, R.; Pople, J. A. *J. Chem. Phys.* 1980, 72, 650 and these did not qualitatively change the results. The inclusion of enthalpic and free energy corrections at a given temperature also did not change the results significantly.

The calculations involved locating four stationary points on the potential energy surface (see Diagram 1). Standard optimizations and defaults within the Gaussian98 program were utilized which included the Berny optimizer in redundant internal coordinates as described in Peng, C.; Ayala, P. Y.; Schlegel, H. B. Frisch, M. J. *J. Comp. Chem.* 1996, 17, 49; and Peng, C.; Schlegel, H. B. *Israel. J. Chem.* 1994, 33, 449. The four structures located were the transition state for ethylene inserting into the M-aryl or M-hydrocarbyl bond of the original species (1), the transition state for ethylene inserting in the polymeryl chain of the original species (2), the product of inserting into the aryl or hydrocarbyl group (3), and the product of inserting into the polymeryl chain (4). The stationary points defined as transition states were confirmed by one and only one imaginary frequency (corresponding to the reaction coordinate) as determined from mass-weighting of the eigenvalues from the diagonalization of the second derivative or Hessian matrix. The two products, 3 and 4, have no imaginary frequencies upon this analysis.

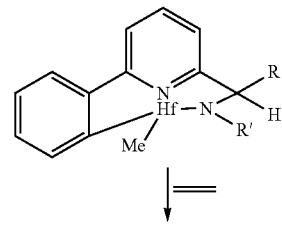

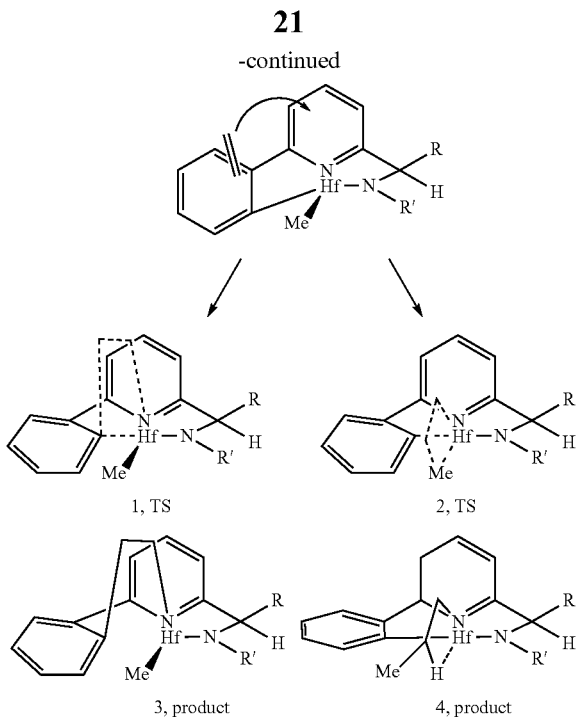

1, TS
2, TS
3, product
4, product

Diagram 1. Pathways to Aryl or Hydrocarbyl Inserted and Alkyl Inserted Products.

In examples involving ethylene/octene, more than one potential 'inserted' catalyst could be formed. Diagram 2 depicts the four possible octene inserted catalysts from one face. These four unique catalysts each could create polymer with different properties such as molecular weight and comonomer incorporation.

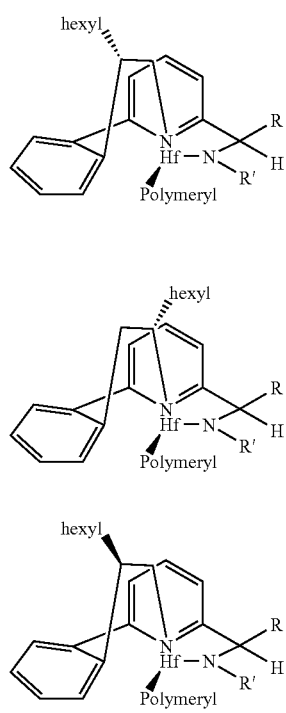

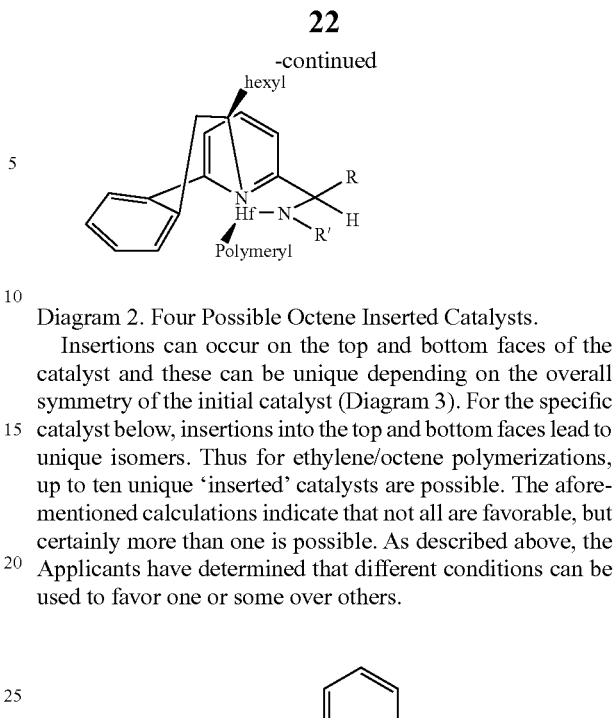

Diagram 2. Four Possible Octene Inserted Catalysts.

Insertions can occur on the top and bottom faces of the catalyst and these can be unique depending on the overall symmetry of the initial catalyst (Diagram 3). For the specific catalyst below, insertions into the top and bottom faces lead to unique isomers. Thus for ethylene/octene polymerizations, up to ten unique 'inserted' catalysts are possible. The aforementioned calculations indicate that not all are favorable, but certainly more than one is possible. As described above, the Applicants have determined that different conditions can be used to favor one or some over others.

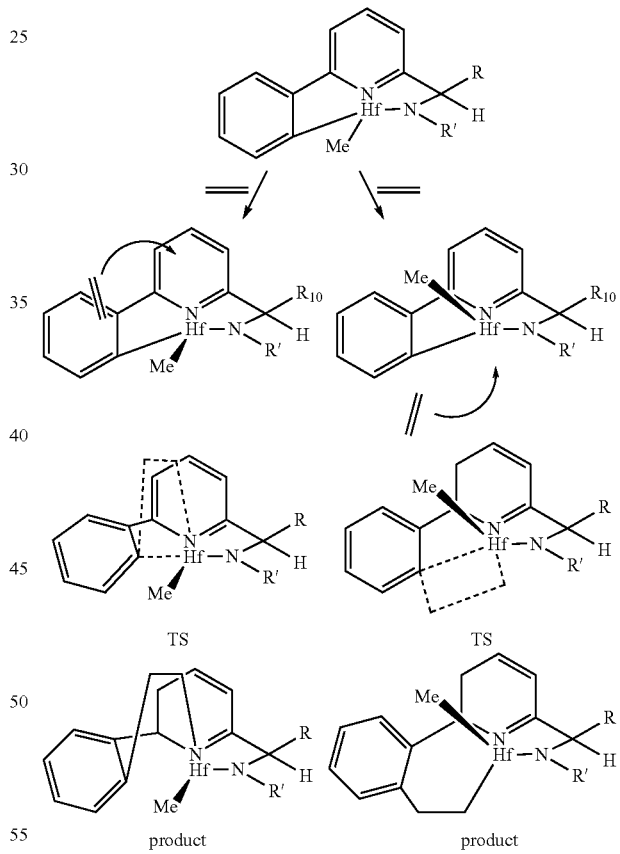

TS
TS
product
product

Diagram 3. Ethylene Inserting into Top and Bottom Faces of the Initial Catalyst. Whether These Two Products are Different Depends on the Symmetry of the Catalyst (Groups at R and R').

Figure 22:
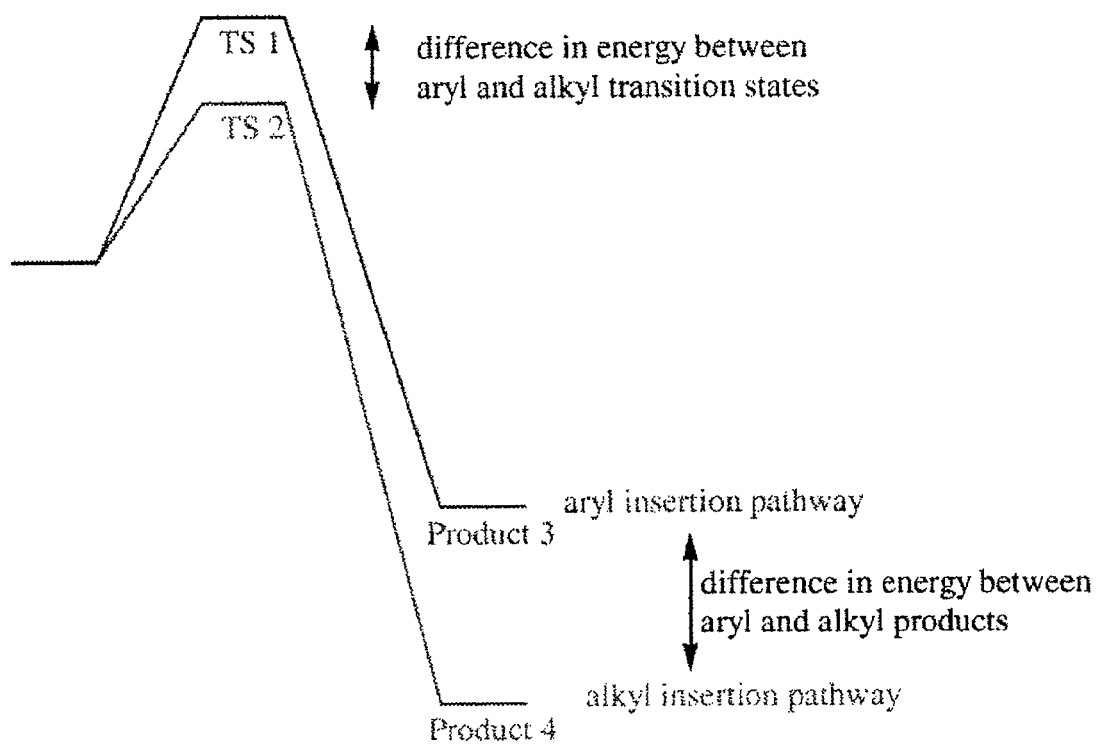
FIG. 22 depicts a potential energy surface of processes TS1 and TS2.

Based on catalyst activity such as the one above, barriers important for the polymerization may be estimated. If insertion into the aryl or hydrocarbyl is less than 10 kcal/mol higher than insertion into the alkyl, this reaction should occur during the polymerization cycle. From Diagram 1 and FIG. 22, this implies that TS 1 lies no higher than 10 kcal/mol above TS 2. It is preferable that this difference is less than 5 kcal/mol and even more preferable that insertion into the aryl or hydrocarbyl is less than insertion into the alkyl. Insertion into the alkyl is not a reversible process, but to avoid reversibility of insertion into the aryl or hydrocarbyl, the product of insertion into the aryl or hydrocarbyl cannot lie more than 5 kcal/mol above insertion into the alkyl. From Diagram 1 and FIG. 22, this implies that Product 3 lies no higher than 5 kcal/mol above Product 4. However, it is preferable that this difference is less and even more preferable that the product of aryl or hydrocarbyl insertion is lower than the product of alkyl insertion. FIG. 22 depicts a potential energy surface of the two processes.

One skilled in the art may apply the above principles in selecting reaction conditions and catalyst to achieve a desired controlled molecular weight.

What is claimed is:

1. A process for producing an ethylene/α-olefin interpolymer composition comprising:
   (a) selecting a single suitable pre-catalyst comprising at least one metal-aryl or metal-hydrocarbyl bond, wherein each pre-catalyst molecule is essentially the same as every other pre-catalyst molecule;
   (b) contacting a concentration of ethylene and an α-olefin with said suitable pre-catalyst, the concentration comprising an α-olefin mole fraction, $f_2$, defined as $$f_2 = \frac{[\alpha\text{-olefin}]}{\sum [\text{ethylene} + \alpha\text{-olefin}]};$$

(c) activating the pre-catalyst to produce an ethylene-inserted cation and an α-olefin-inserted cation;
   (d) forming, with the cations, under continuous reaction polymerization conditions an ethylene/α-olefin interpolymer composition with a bimodal molecular weight distribution and comprising a high molecular weight component and a low molecular weight component; and
   (e) controlling the amount of high molecular weight component by controlling the value of f2.

2. The process of claim 1 which further comprises employing a pre-catalyst comprising a ligand and terminating the reaction conditions via a catalyst quench.

3. The process of claim 2 wherein a ligand fragment with an appended olefin can be detected from the catalyst quenchate.

4. The process of claim 1 wherein the reaction conditions comprise at least one cocatalyst differing from the pre-catalyst.

5. The process of claim 1 wherein the suitable pre-catalyst is selected from the group consisting of hydrocarbylamine substituted heteroaryl compounds corresponding to the formula:

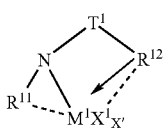

wherein:
   $R_{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;
   $T^1$ is a divalent bridging group of from 1 to 41 atoms other than hydrogen;
   $R^{12}$ is a $C_{5-20}$ heteroaryl group containing Lewis base functionality;
   $M^1$ comprises hafnium or other Group 4 metal;
   $X^1$ is an anionic, neutral or dianionic ligand group;
   x' is a number from 0 to 5 indicating the number of such $X_1$ groups; and bonds, optional bonds and electron donative interactions are represented by lines, dotted lines and arrows respectively, in contact with a co-catalyst.

6. The process of claim 1 wherein the ethylene/α-olefin interpolymer composition is produced in a single polymerization reactor.

7. The process of claim 1 wherein the ethylene/α-olefin interpolymer composition is produced using N-(2,6-di(1-methylethyl)phenyl)amido)(2-isopropylphenyl)(α-naphthalen-2-diyl(6-pyridin-2-diyl)methane)]hafnium dimethyl.

8. A process for producing an ethylene/α-olefin interpolymer composition comprising:
   (a) selecting a single pre-catalyst comprising at least one metal-aryl or metal-hydrocarbyl bond, wherein each pre-catalyst molecule is essentially the same as every other pre-catalyst molecule;
   (b) contacting the pre-catalyst with ethylene and at least one α-olefin monomer;
   (c) changing, with the contacting, the ligand structure of the pre-catalyst and forming a catalyst mixture comprising (i) an ethylene-inserted cation and (ii) an alpha olefin-inserted cation;
   (d) forming, with the cations, an ethylene/α-olefin interpolymer composition with a bimodal molecular weight distribution under continuous reaction polymerization conditions, the ethylene/α-olefin interpolymer having a low molecular weight component formed by the ethylene-inserted cation and a high molecular weight component formed by the alpha olefin-inserted cation.

9. The process of claim 8 comprising combining the pre-catalyst with a member selected from the group consisting of a mixture of ketones, a cocatalyst, a shuttling agent, and combinations thereof.

10. The process of claim 8 comprising controlling the amount of low molecular weight component and the amount of high molecular weight component by controlling the relative amounts the ethylene-inserted cation and the alpha olefin-inserted cation.

11. The process of claim 8 comprising
controlling the concentration of ethylene and α-olefin contacted with the pre-catalyst such that the mole fraction $f_2$, is defined as $$f_2 = \frac{[\alpha\text{-olefin}]}{\sum [\text{ethylene} + \alpha\text{-olefin}]}.$$

12. The process of claim 5 wherein $R^{12}$ comprises a pyridin-2-yl- or substituted pyridin-2-yl group or a divalent derivative thereof.

13. The process of claim 8 wherein the pre-catalyst comprises hafnium.

* * * * *